United States Patent
Seimiya

(10) Patent No.: US 7,487,156 B2
(45) Date of Patent: Feb. 3, 2009

(54) INFORMATION PROVIDING APPARATUS

(75) Inventor: Hiroshi Seimiya, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/240,379

(22) PCT Filed: Jan. 31, 2002

(86) PCT No.: PCT/JP02/00800

§ 371 (c)(1), (2), (4) Date: Apr. 19, 2004

(87) PCT Pub. No.: WO02/061585

PCT Pub. Date: Aug. 8, 2002

(65) Prior Publication Data

US 2004/0181546 A1    Sep. 16, 2004

(30) Foreign Application Priority Data

Jan. 31, 2001 (JP) .............................. 2001-23789
Mar. 2, 2001 (JP) .............................. 2001-59099

(51) Int. Cl.
*G06F 17/30* (2006.01)
(52) U.S. Cl. ..................... 707/10; 707/104.1
(58) Field of Classification Search ............. 707/104.1, 707/1–3, 10; 455/68, 424, 455
See application file for complete search history.

(56) References Cited

U.S. PATENT DOCUMENTS

| | | | |
|---|---|---|---|
| 5,757,798 A * | 5/1998 | Hamaguchi | 370/397 |
| 6,073,062 A * | 6/2000 | Hoshino et al. | 701/3 |
| 6,122,658 A | 9/2000 | Chaddha | |
| 6,148,330 A | 11/2000 | Puri et al. | |
| 6,199,055 B1 * | 3/2001 | Kara et al. | 705/405 |
| 6,381,513 B1 * | 4/2002 | Takase et al. | 700/231 |
| 6,968,158 B1 * | 11/2005 | Bhuta et al. | 455/68 |

(Continued)

FOREIGN PATENT DOCUMENTS

JP    2000-115253    4/2000

(Continued)

OTHER PUBLICATIONS

"HTTP:WWW.ZDNET.CO.JP/EWEEK/0012/04/00120405.HTML", Dec. 4, 2000.

(Continued)

*Primary Examiner*—Don Wong
*Assistant Examiner*—Hanh B Thai
(74) *Attorney, Agent, or Firm*—Finnegan, Henderson, Farabow, Garrett & Dunner, L.L.P.

(57) ABSTRACT

An information providing apparatus for re-distributing to a mobile phone (113) an information image in which image information and at least related information defining a unique process are integrated as a single operation unit, the information image having been distributed to a client (103) connected via a network (106), includes an information image separation unit (110) for separating the information image that has been distributed to and registered in the client (103) into image information and related information; and a re-distribution unit (111) for distributing to the mobile phone (113) the image information and the related information that have been separated by the information image separation unit (110).

12 Claims, 20 Drawing Sheets

U.S. PATENT DOCUMENTS

| | | | |
|---|---|---|---|
| 7,010,144 B1 * | 3/2006 | Davis et al. | 382/100 |
| 2001/0029182 A1 * | 10/2001 | McCann et al. | 455/433 |
| 2002/0046207 A1 * | 4/2002 | Chino et al. | 707/3 |
| 2002/0198851 A1 * | 12/2002 | Hashimoto et al. | 705/400 |

FOREIGN PATENT DOCUMENTS

| | | |
|---|---|---|
| JP | 2000-122957 | 4/2000 |
| JP | 2002-163167 | 6/2002 |

OTHER PUBLICATIONS

"HTTP:WWW.ZDNET.CO.JP/NEWS/0003/22/IP3.HTML", Mar. 22, 2000.

Nikkei Electronics, Feb. 24, 1997, No. 683, pp. 99-124.

Walter Bender, Nikkei Electronics, Feb. 24, 1997, No. 683, pp. 149-162.

Mobile Press, Mar. 18, 1999, pp. 10, 11.

Junichiro Tsuji, et al., "Prototyping of Mobile Proxy Server System", Jul. 25, 1997, vol. 97, No. 72, pp. 67-72.

* cited by examiner

FIG. 9

| CLIENT ID | INFORMATION IMAGE ID | REGISTRATION DATE/TIME | OTHERS |
|---|---|---|---|
| 13524521545583 | 521425487.jpg | 2000/9/6 12:30 | |
| ... | ... | ... | ... |
| | | | |

| CLIENT ID | PERSONAL INFORMATION | PORTABLE PHONE NUMBER | OTHERS |
|---|---|---|---|
| 13524521545583 | .... | 090-999-0000 | |
| ... | ... | ... | ... |
| | | | |

| PROVIDER ID | INFORMATION IMAGE ID |
|---|---|
| 12345678 | 12345678.gif |
| ... | ... |
| | |

FIG. 16B

| PORTABLE TERMINAL ID | CLIENT ID |
|---|---|
| 090-1234-1234 | 125245245455 |
| ... | ... |
| | |

FIG. 18

| CLIENT ID 3301 | INFORMATION IMAGE ID 3302 | REGISTRATION DATE/TIME 3303 | OTHERS 3304 |
|---|---|---|---|
| 13524521545583 | 521425487.jpg | 2000/9/6 12:30 | |
| ... | ... | ... | ... |
| | | | |

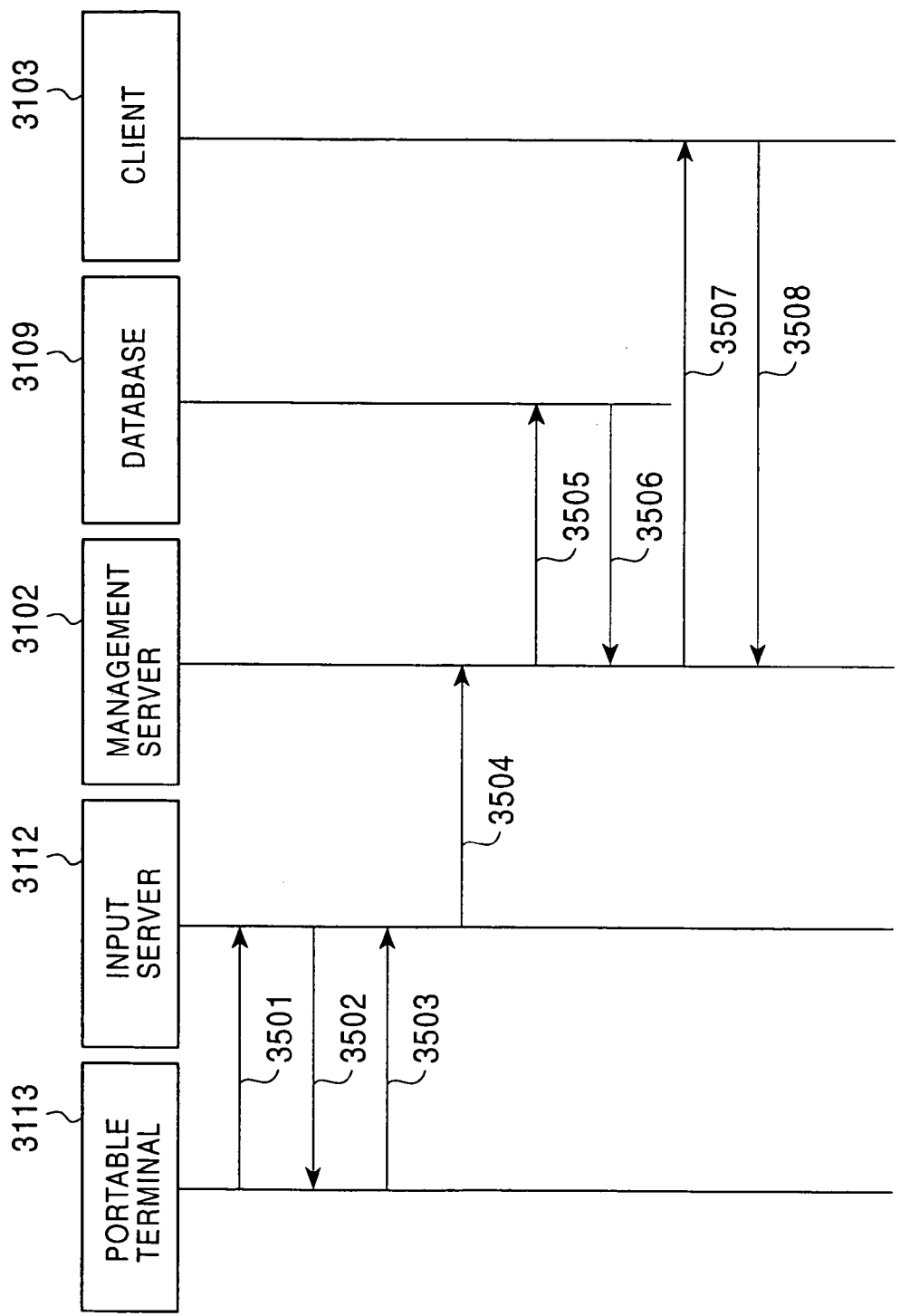

INFORMATION PROVIDING APPARATUS

TECHNICAL FIELD

The present invention relates to an information providing apparatus for distributing an information image in which image information and at least related information defining a unique process are integrated as a single operation unit to an information terminal or to a portable terminal connected via a network, providing various services using the information image.

BACKGROUND ART

When an advertiser wishes to communicate information to users in general, in general wireless broadcast, since channels to be tuned in by the users are limited, an advertisement effect is achieved by explaining a product for several seconds to several minutes.

As opposed thereto, on the Internet, which has recently been developing explosively, information intended by an advertiser can only be communicated by letting the users perform an operation, for example, specifying a URL via a keyboard of a terminal or using a link function that readily allows reference to another page.

Accordingly, in methods of advertisement on the Internet that have been proposed and implemented, for example, a special window is displayed in a display portion of a user terminal by a program for Internet connection distributed to each user by an Internet service provider, displaying an advertisement image in the window, or a layout in which an advertisement banner is displayed together with a news, etc. is used.

These methods, however, are similar to those that have hitherto been implemented by an advertising tower disposed at a street corner, etc., and does not fully take advantage of a network.

Accordingly, the inventors of the present invention have proposed, for example, in Japanese Patent Application No. 2000-079182, a system, etc. that allows an operator to access, by a simple operation, information intended by an information provider, using an "information image" in which image information and at least related information defining a unique process are integrated as a single operation unit, the related information including a URL, etc., and that allows the information provider to provide a new information image and to update the information image so that a clue for providing new information will be recognized by the operator at any time.

By using the information image, the information image provider is allowed to define and execute various control operations of a terminal apparatus, and furthermore, by using an image that indicates a program operation, content of the operation is readily understood. Furthermore, because the image information and the related information are inseparably integrated, illegitimate use for an unintended purpose is discouraged, and even if the information image is distributed, a returning effect from a distribution end to information of the image provider can be expected.

Such an information image, however, requires special software for spreading it out, and it is inconvenient when, for example, a user wishes to view the information at a visiting place. Accordingly, a system that allows an information image that has once been obtained to be re-obtained anywhere has been desired.

Furthermore, from a viewpoint of a server, a problem has existed that it is difficult to manage each user via the software for spreading out an information image.

Furthermore, in some cases, a user finds a shop of interest at a visiting place and wishes to register a URL of a Web site of the shop in a personal computer at home in order to obtain information regarding the shop. In such cases, hitherto, the user takes note of the URL on a sheet of paper, etc. and directly enters the URL in the personal computer at home after coming home to reference the site, or sends an electronic mail including the URL from a mobile phone, etc. to a mail address so that the electronic mail can be read from the personal computer at home, and opens the electronic mail after coming home to reference the site.

The above task, however, is laborious, and actually is not used so often. It will be extremely convenient if a URL, etc. of a desired shop can be registered in a personal computer at home by performing a simple operation on a portable terminal, which will contribute to further development of network-based commercial transactions.

It is an object of the present invention to provide an information image providing apparatus that allows a user to readily obtain an information image.

It is another object of the present invention to provide an information image providing apparatus that allows an information image once obtained to be re-obtained anywhere and that also allows management of each user.

It is yet another object of the present invention to provide an information providing apparatus that readily allows access to information on a network related to information obtained at a street corner, etc.

DISCLOSURE OF INVENTION

In order to achieve the above objects, the present invention employs the following schemes.

In the following description, the term "information image" refers to image information and at least related information defining a unique process that are integrated as a single operation unit. Detailed description will be given in relation to embodiments of the present invention. It is to be noted herein that "information image" and "image information" are clearly distinct concepts.

The present invention, in one aspect thereof, provides an information providing apparatus for re-distributing an information image in which image information and at least related information defining a unique process are integrated as a single operation unit to an information terminal or to a portable terminal connected via a network, said information providing apparatus comprising an input unit for receiving a request for distributing the information image from the portable terminal; and a distribution unit for distributing the information image to the information terminal or to the portable terminal in response to the request for distributing the information image, received by said input unit.

The present invention, in another aspect thereof, provides an information providing method for re-distributing an information image in which image information and at least related information defining a unique process are integrated as a single operation unit to an information terminal or to a portable terminal connected via a network, said information providing method comprising the steps of receiving a request for distributing the information image from the portable terminal; and distributing the information image to the information terminal or to the portable terminal in response to the received request for distributing the information image.

An information image herein refers to image information and at least related information defining a unique process that are integrated as a single operation unit, and can be grasped, for example, by a single file name. Display on a user interface is based on the image information, and if an operator specifies the information image for operation, content of the operation is determined based on the related information.

The information image may be an information image that has been distributed to the information terminal, with said information providing apparatus further comprising an information image separation unit for separating the information image that has been distributed to and registered in the information terminal into image information and related information; and a re-distribution unit for re-distributing the image information and the related information that have been separated by said information image separation unit to the portable terminal.

The information image separation unit separates the information image constituting a single operation unit as described above into image information and related information, and the re-distribution unit distributes the image information and related information to the portable terminal. Creation and reading of the information image require special software; however, according to the present invention, the information image separation unit separates the information image into image information and related information before distribution to the portable terminal, so that content of the information image can be read even if special software is not installed on the portable terminal.

Accordingly, an information image that has once been obtained by the information terminal can be re-obtained by the portable terminal anytime and anywhere, and various information can be obtained by the portable terminal at a desired time and place based on the re-obtained information itself or the re-obtained information.

The information providing apparatus may comprise a user identification unit for identifying a user of the information terminal; and a registration information recording unit for registering the user of the information terminal and the information image that has been distributed to the information terminal in association with each other; wherein said re-distribution unit distributes the image information and the related information of the information image that has been registered in said registration information recording unit to the user identified by said user identification unit.

Alternatively, when re-distributing information to the portable terminal, the user of the information terminal may be identified, distributing the image information and the related information of the registered information image to the identified user.

Since image information and related information to be re-distributed to a portable terminal have been distributed to a particular user, it is preferable from the viewpoint of managing personal information that users of the information terminal associated with the distribution and of a portable terminal associated with re-distribution are identified, allowing distribution only when the users are recognized as being the same while rejecting distribution otherwise.

Accordingly, the user of the information terminal and the information image that has been distributed to the information terminal are registered in the registration information recording unit in association with each other, and upon an access by the portable terminal, the user of the portable terminal is identified by the user identification unit, re-distributing only image information and related information that have been distributed to the user. This serves to prevent leak and stealing of personal information.

The identification of the user may be based on a unique identifier of the user, a password, etc., and without limitation thereto, may be based on any identifier as long as the user can be identified.

The timing of separating the information image into image information and related information is not particularly limited, and the following modes may be employed.

The timing may be such that information image is separated into image information and related information immediately after the information image has been distributed to the information terminal, the image information and related information are converted into a distribution format and recorded. Upon an access by the portable terminal, the information recorded in the distribution formation is distributed as it is. In this mode, since no process takes place between the access by the portable terminal to distribution, response time of re-distribution to the portable terminal becomes shorter.

Alternatively, the timing may be such that the information image is separated into image information and related information immediately after the information image has been distributed to the information terminal, the image information and related information are recorded, and the image information and related information are converted into a distribution format upon an access by the portable terminal. In this mode, since conversion into the distribution format takes place upon an access by the portable terminal, a conversion process in accordance with a format of the portable terminal can be executed, serving to improve visibility on the portable terminal. Furthermore, although response time becomes longer compared to the first mode described above, storage capacity in the information image separation unit becomes smaller.

Alternatively, the timing may be such that the information image is recorded immediately after the information image has been distributed to the information terminal, the information image is separated into image information and related information upon an access by the portable terminal, and image information and related information are converted into a distribution format. In this mode, since the information image is recorded as it is, storage capacity in the information image separation unit becomes smaller.

The present invention, in another aspect thereof, provides an information providing apparatus for providing information to an information terminal that is connected via a network, said information providing apparatus comprising first storage means storing second information regarding a plurality of information distributing entities, respectively associated with first information that is assigned for identifying the information distributing entities; and information providing means for extracting, in response to a distribution instruction accompanied with first information input from a portable terminal that is allowed to communicate via the network, second information associated with the first information from said first storage means, and for distributing the extracted second information to the information terminal.

According to the present invention, by entering first information for identifying an information distributing entity and issuing a distribution instruction from a portable terminal such as a mobile phone, second information associated with the first information is distributed to the information terminal, for example, a personal computer at home. As a specific example of usage, the first information is displayed at a business facility of the information distributing entity, such as a shop or an advertisement facility. A user passing by, who wishes to know detailed information regarding the business facility only has to enter the first information from his/her portable terminal and to issue a distribution instruction, whereby information regarding the information distributing entity is distributed to a personal computer at home functioning as an information terminal. Accordingly, the information can be accessed as soon as coming home, so that desired information can be readily accessed without laborious work that has hitherto been performed. The second information regarding the information distributing entity in this case is not limited to information regarding the information distributing entity itself, and may be, for example, link information for accessing the information regarding the information distributing entity.

The second information is not particularly limited, and for example, an information image in which image information and at least related information defining a unique process are integrated as a single operation unit may be used. An information image herein refers to image information and at least related information defining a unique process that are integrated as a single operation unit, and can be grasped, for example, by a single file name. Display through a user interface is based on the image information, and if a user specifies the information image for operation, content of the operation is determined based on the related information.

A function for entering the first information and issuing the distribution instruction from the portable terminal may be implemented by executing a special program on the portable terminal. Alternatively, first input screen providing means for providing the portable terminal with input screen information for entering the first information and issuing the distribution instruction from the portable terminal may be provided, implementing the function by an access to the first input screen providing means.

Furthermore, second storage means prestoring third information for identifying an information terminal to which the second information is to be distributed according to the distribution instruction from the portable terminal may be provided, distributing the second information to a corresponding information terminal in accordance with the third information. The corresponding relationship between portable terminal and information terminal in the third information need not be a single portable terminal to a single information terminal, and may be a single portable terminal to a plurality of information terminals, a plurality of portable terminals to a single information terminal, or a plurality of portable terminals to a plurality of information terminals.

Alternatively, the third information may be input from the portable terminal each time. In that case, second input screen providing means for providing the portable terminal with input screen information for inputting third information for identifying an information terminal to which the second information is to be distributed according to the distribution instruction from the portable terminal is provide, and inputs are made thereby.

The present invention, in yet another aspect thereof, provides an information providing method for providing information to a terminal that is connected via a network, wherein, in response to a distribution instruction accompanied with first information for identifying an information distributing entity, input from a first terminal, second information associated with the first information is distributed to a second terminal that is different from the first terminal. The second information may be an information image in which image information and at least related information defining a unique process are integrated as a single operation unit, similarly to the case of the information providing apparatus described earlier.

According to the information providing method of the present invention, the terminal for issuing the distribution instruction accompanies with the first information (the first terminal) and the terminal to which the second information is distributed according to the distribution instruction (the second terminal) are different. When a plurality of terminals including portable terminals and information terminals are used, an arbitrarily specified terminal (the second terminal) receives an instruction for distributing information from another terminal (the first terminal), so that information can be unitarily managed by the arbitrarily specified terminal (the second terminal).

Without limitation, the arrangement may be such that the first terminal is a portable terminal that is allowed to communicate via the network, and the second terminal is an information terminal that is capable of displaying image information of an information image distributed as the second information and executing a process in accordance with related information of the information image.

Furthermore, in the information providing method according to the present invention, the first information may be displayed at a business facility of the information distributing entity, such as a shop or an advertisement facility. For example, if a user wishes to obtain detailed information regarding the business facility, the user enters the displayed first information from the first terminal carried with the user and issues a distribution instruction, whereby information is accumulated in the second terminal at home.

BRIEF DESCRIPTION OF THE DRAWINGS

FIG. 9 is a (partial) configuration diagram of a registration information recording unit of an information image management server according to the first embodiment.

FIG. 11 is a (partial) configuration diagram of the registration information recording unit of the information image management server according to the first embodiment.

FIG. 16A shows content of a first database according to the second embodiment, and FIG. 16B is a diagram showing content of a second database.

FIG. 18 is a (partial) construction diagram of a registration information recording unit of an information management server according to the second embodiment.

FIG. 20 is a diagram showing a procedure from finding of a provider ID to registration of an information image in a second management area.

BEST MODE FOR CARRYING OUT THE INVENTION

Embodiments of the present invention will now be described with reference to FIGS. 1 to 20.

1. Presuppositions

First, presuppositions of embodiments of the present invention will be described. In particular, an "information image" relating to the present invention will be described in detail.

(1-1. Related information)

First, "related information" embedded in an information image will be described.

Related information serves as a basis for letting an operator of a client visually recognize an image and execute a particular operation based on the image. That is, related information is information associated with image information. For example, when letting an operator of a client reference information residing on a particular server, information (a URL, an IP address, etc.) identifying that information serves as related information. When a particular program is to be executed, related information may be a name of the program or the program itself. For example, related information may be instruction information for obtaining new image information from a server. Information for identifying that information may be an information image file itself, or a URL of a page that serves as a basis for obtaining information image.

(1-2. Information Image Embedding Related Information in Addition to Image Information)

Next, "information image embedding related information," which is also a presupposition relating to the embodiments, will be described with reference to FIGS. 6 and 7. Information to be embedded may be related information or an identifier for identifying the image.

Figure 6:
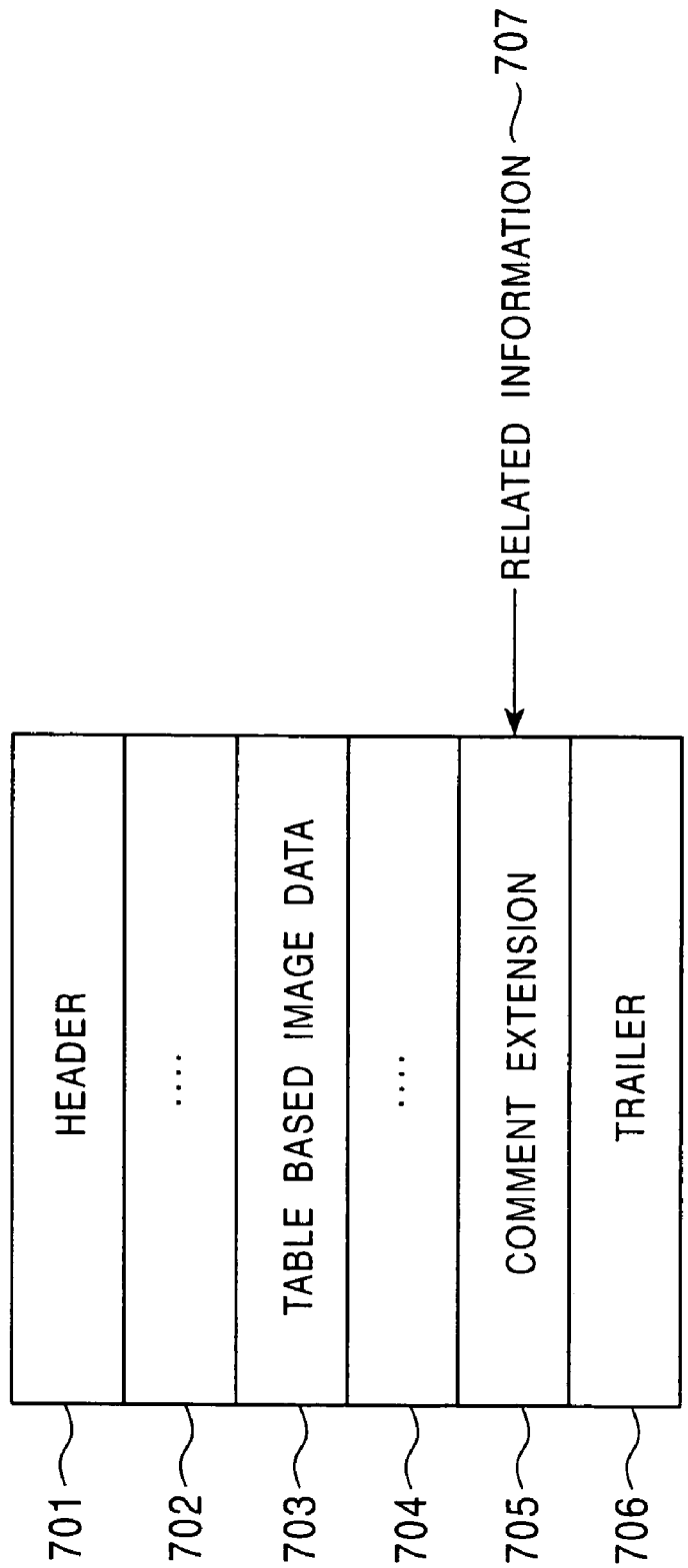
FIG. 6 shows an example configuration of an information image according to the present invention.

FIG. 6 is a diagram showing an example format of an information image in which related information is embedded. Image information in the example is an image in GIF format. The format need not be GIF format, and may be, for example, JPG=JPEG (Joint Photographic Expert Group) format or PCX format.

Referring to the figure, a header 701 is a field for identifying the information as image information in GIF format, to which a character string 'GIF' and a version thereof are assigned.

Table based image data 703 is image data in which pixels are arranged in order of left to right and top to bottom. In the case of GIF, the data is encoded based on the variable-length LZW (Lempel-Ziv-Welch) algorithm.

A comment extension 705 includes text information that does not constitute graphic information in the GIF data stream. It allows inclusion of comment regarding graphics, production staff, and content description, or any data other than control data and graphic data. This portion is usually disregarded in display.

A trailer 706 indicates end of the data stream, i.e., no parameter information, etc. follows thereafter.

Furthermore, in 702 between the header 701 and the table based image data 703, and in 704 between the table based image data 703 and the comment extension 705, information other than the above is included. For example, information including parameters defining an area of a display apparatus, such as a screen width, a screen height, and a color resolution, required for drawing an image, is allocated.

Related information 707 is placed in the comment extension 705, as it is or after undergoing an encryption process, etc., thus being integrated in the image information. Accordingly, the image information constituting the data stream is allowed to include related information or an identifier.

Although the above description has been made in the context of GIF format, other image formats may be used.

Next, another format of embedding in image information will be described with reference to FIG. 7.

Figure 7:
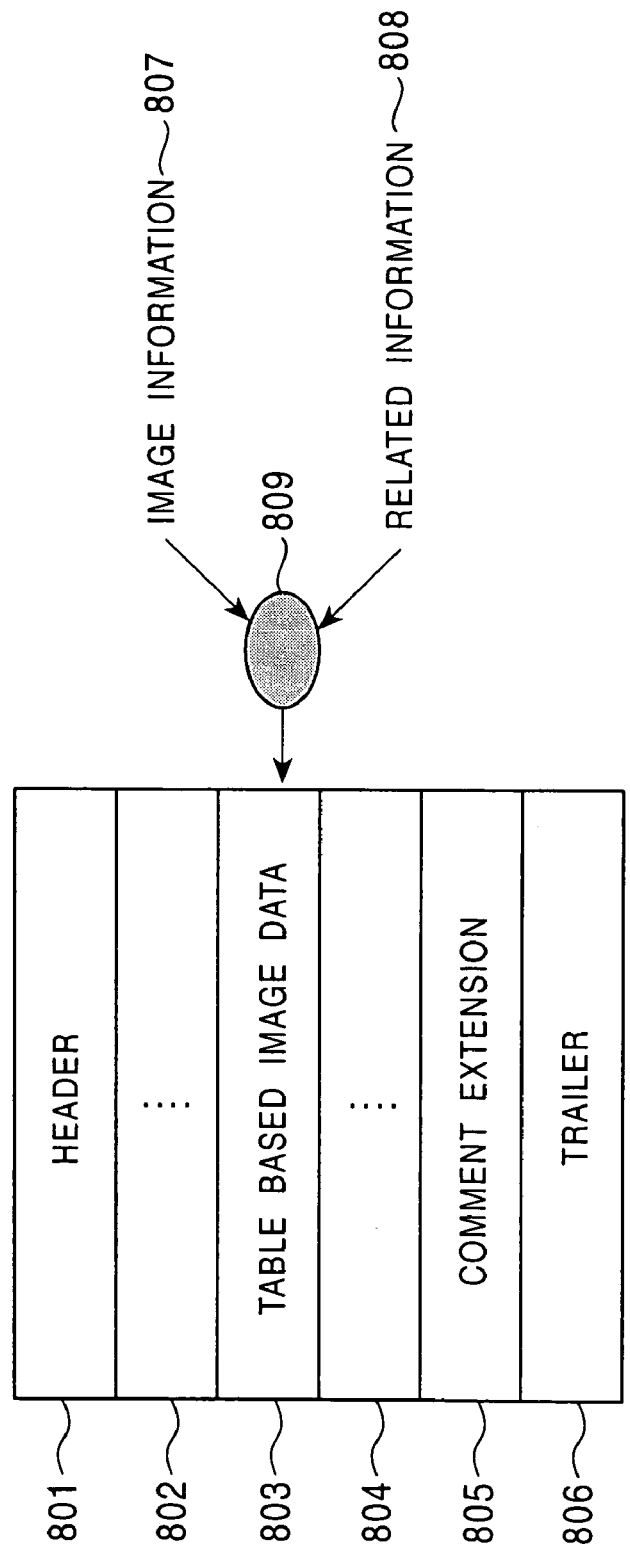
FIG. 7 shows another example configuration of an information image according to the present invention.

FIG. 7 is a diagram showing another example format of image information in which related information is embedded. Again, image information in the example is an image in GIF format. Also in this example, the format need not be GIF format, and may be, for example, JPG format or PCX format.

Similarly to the example described earlier, a header 801 is a field for identifying the information as image information in GIF format, to which a character string 'GIF' and a version thereof are assigned.

Table based image data 803 includes image data in which pixels are arranged in order of left to right and top to bottom. In this example, image information 807 and related information 808 are mixed 809 in the form of digital watermark so that the related information will be inhibited from being visually recognized as it is whereas the image information will be visually recognized as it is. The information thus mixed 809 is encoded using the variable-length LZW algorithm.

A comment extension 805 includes text information that does not constitute graphic information in the GIF data stream. This field is not particularly required in this example; however, an information provider is allowed to use this field with an arbitrary definition as required.

A trailer 806 indicates end of the data stream, i.e., no parameter information, etc. follows thereafter.

Also with regard to this example image, although the above description has been made in the context of GIF format, other image formats may be used.

(1-3. Graphic Images Displayed on Display Terminal)

Examples of graphic images that are displayed on a client, relating to the present invention, will be described with reference to FIGS. 2 to 5.

a. Example of Graphic Image Suitable for Computers

Figure 2:
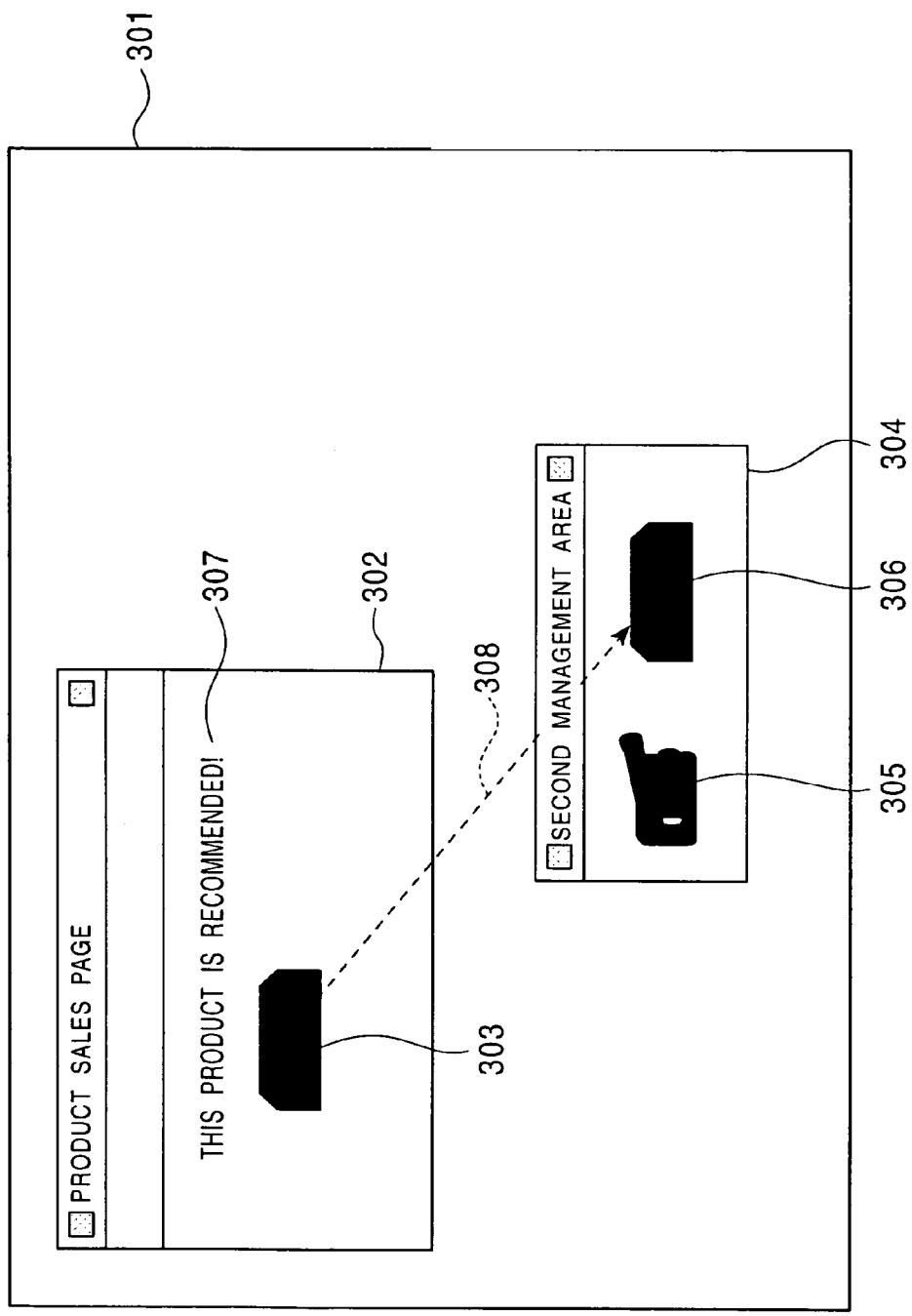
FIG. 2 is a diagram for explaining an example operation (drag-and-drop operation) for registering an information image from a first management area to a second management area according to the present invention.

When a computer that supports an OS that is capable of graphic display, such as Windows 9x, Windows NT, Windows 2000, or Linux, is used as a display/operation terminal, a look and feel such as that shown in FIG. 2 is suitable, which will now be described.

A display screen 301 is, for example, a cathode ray tube display screen, a TFT liquid crystal display screen, or a screen of a display apparatus incorporated in glasses to be worn on a human body, and it operates so as to allow a person to visually recognize information from the display/operation apparatus. Although the periphery of the display screen 301 is shown in the figure as being the outermost frame of the display device, the frame may be displayed in the display device.

A one-touch window 304 serves to display at least images (or image information such as pictures, hereinafter the same) 305 and 306. When an operator of a terminal of the information display apparatus specifies the image 305 using operation means not shown, the one-touch window 304 displays at least one item of related information so that a process based on the information can be activated, and if a plurality of items exists, the items are selected so that a process based on the information can be activated. That is, the one-touch window 304 on the display screen 301 functions as a special management area (corresponding to a display portion of what is described as a second management area herein) for guiding a particular operation based on the images 305 and 306, and it allows the operator of the terminal to execute a new operation based on the images displayed in the area. If a mouse is provided as operation means, preferably, for example, a pop-up menu appears when the mouse is right-clicked, in which related information is displayed, and if the related information includes a plurality of information items, one of the related information items is specified by left clicking.

An information providing window 302 is a frame for displaying at least an image 303, etc. If the operator of the terminal of the information display apparatus specifies an image displayed in the frame using operation means not shown, a new image is added to and registered in the one-touch window 304 based on the operation.

The image added to and displayed in the one-touch window 304 at this time may be the image that has been specified and displayed in the information providing window 302, and may be replaced with another image as needed. The information providing window 302 may display text information 307, etc. as well as an image.

That is, the information providing window 302 on the display screen 301 functions as a management area (corresponding to a display portion of what is described as a first management area herein) for drawing attention of the operator of the terminal by displaying an image, etc. and for guiding the operator of the terminal to execute an operation of specifying an image for registration in the one-touch window 304.

With regard to the specifying operation by the operator of the display/operation terminal, if a pointing device such as a mouse is provided to operation means, it is desirable to use a user interface technique called drag-and-drop, in which an image to be registered is specified using the pointer and is moved to and dropped in the one-touch frame 302 (308). By using the user interface, for example, if Internet Explorer or Netscape Navigator is used as the information providing window 302, advantageously, a feel of operation similar to that of other Windows programs is achieved.

b. Another Example of Graphic Image Suitable for Computer

Figure 3:
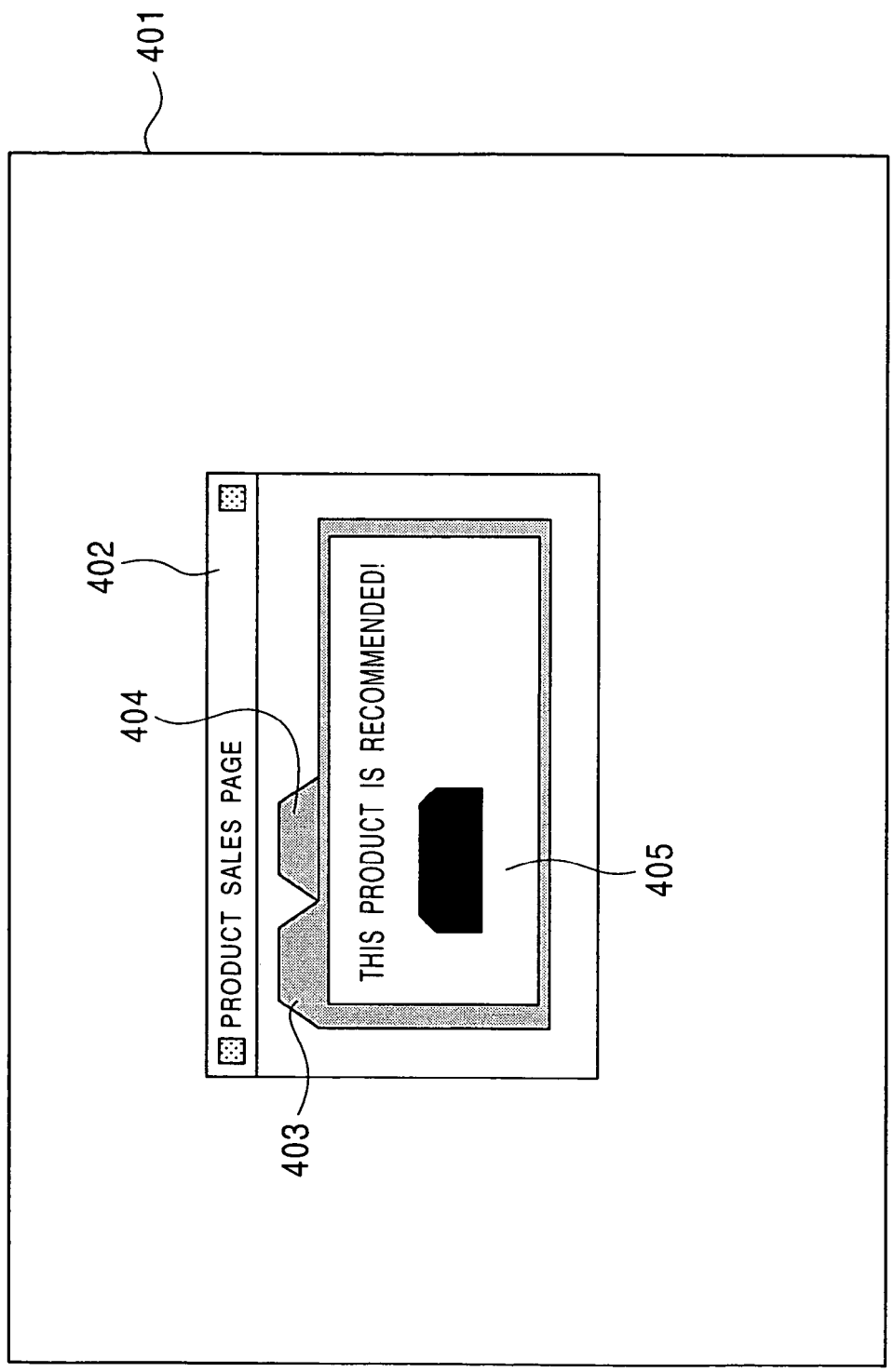
FIG. 3 is a diagram for explaining another example operation for registering an information image from the first management area to the second management area according to the present invention.
Figure 4:
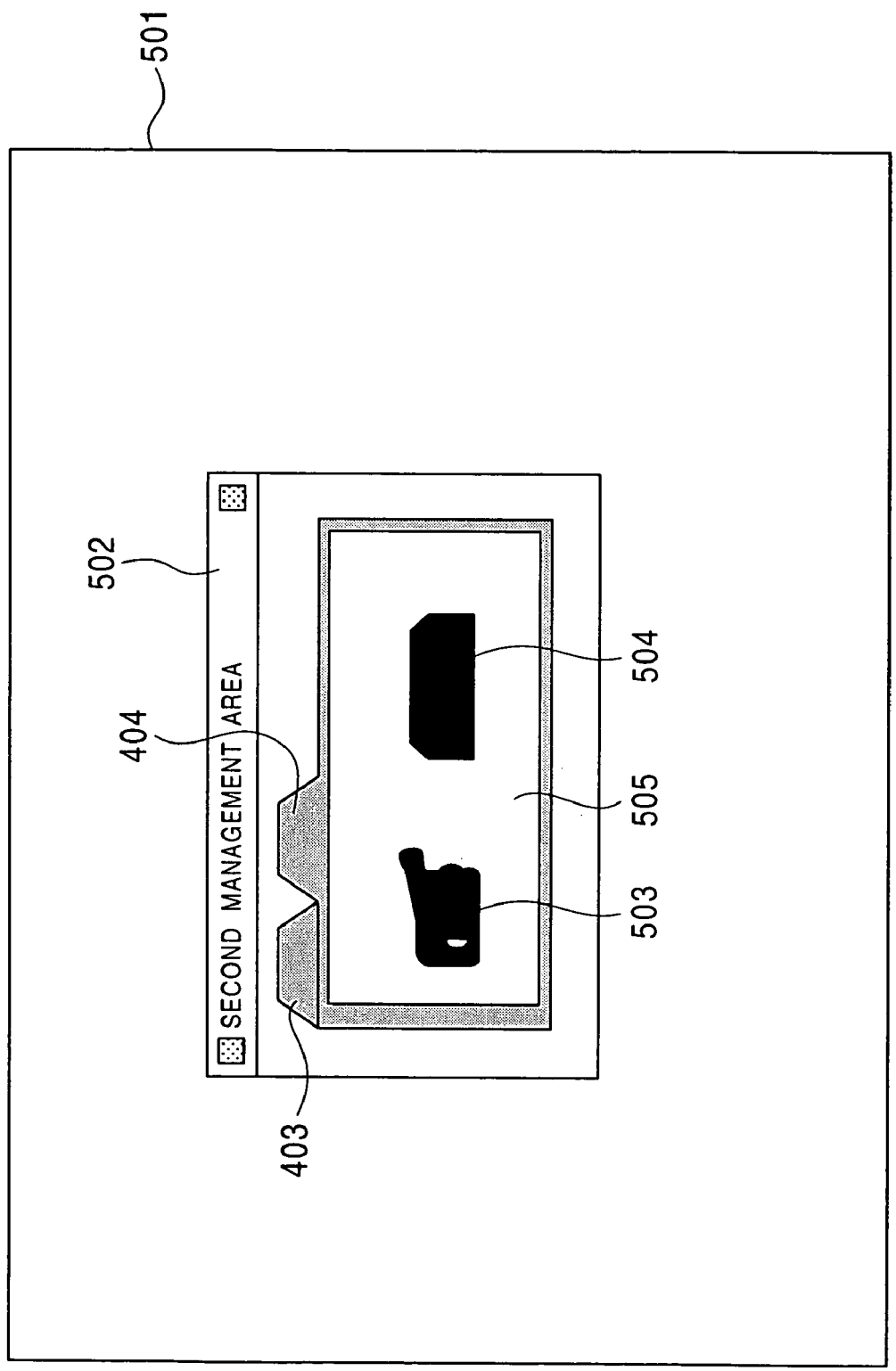
FIG. 4 is a diagram for explaining another example operation for registering an information image from the first management area to the second management area according to the present invention.

As another example of interface, a window shown in FIGS. 3 and 4 may be used.

Display screens 401 and 501 are, for example, cathode ray tube display screens, TFT liquid crystal screens, or screens of a display apparatus incorporated in glasses to be worn on a human body, and they operate so as to allow a person to visually recognize information from the display apparatus.

Information display/registration window 402 functions as an interface for letting an operator perform operations for displaying and registering an image obtained from an information provider.

An information providing tab 403 is an interface component for selecting a management area provided in an area of the information display/registration window 402, and when it is activated, an image received from an information provider is displayed in a first management area 405. When the operator of the terminal of the information display apparatus specifies an image to be displayed therein using operation means not shown, based on the operation, a new image is added to a second management area, which is displayed when a one-touch tab 404 is activated.

The one-touch tab 404 is an interface component for selecting a management area provided in an area of the information display/registration window 402, and when it is activated, the second management area is displayed, and a new image associated with the image specified in the first management area 405 for registration is displayed in the second management area 505. When the operator of the terminal of the information display apparatus specifies the image displayed therein using operation means not shown, based on the operation, the second management area 505 displays at least one item of related information so that a process based on the information can be activated, and if a plurality of items exists, the items are selected so that a process based on the information can be activated. That is, the second management area 505 on the information display/registration window 502 functions as a management area (second management area) for guiding a particular operation based on the images 503 and 504, and it allows the operator of the terminal to execute a new operation based on the images displayed in the area.

When the above user interface is used, in cases where the size of the display screens 401 and 501 is small or if the resolution of the screens is low, advantageously, operations for displaying and registering information can be completed in small display areas.

c. Another Example of Graphic Image Suitable for Digital Television or PDA

Figure 5:
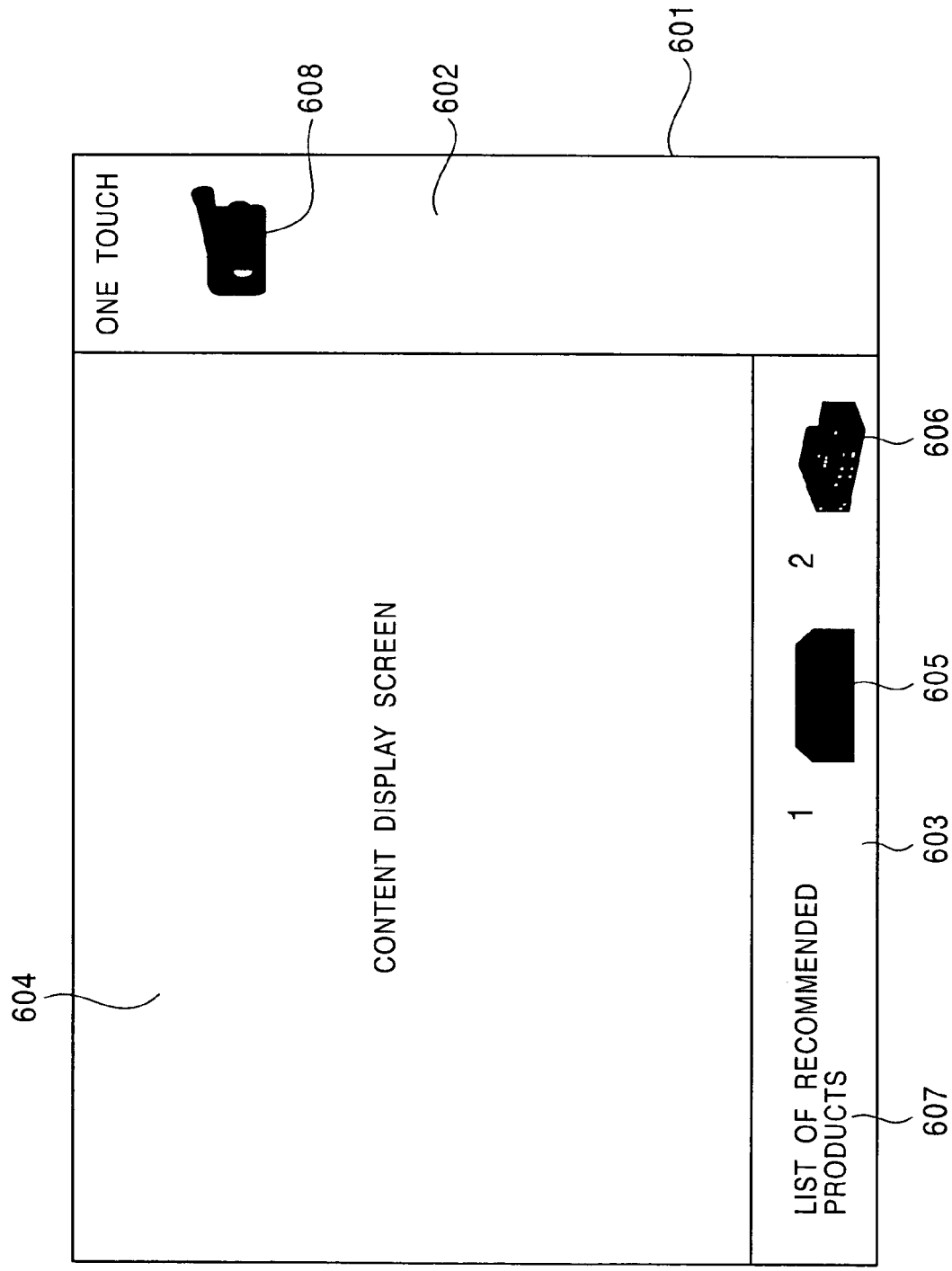
FIG. 5 is a diagram for explaining another example operation for registering an information image from the first management area to the second management area according to the present invention (in which a terminal with a relatively small display area, such as a PDA, is used as a client).

When an information image is used for a digital television or a portable terminal such as a PDA (Personal Data Assistance), a look and feel shown in FIG. 5 is suitable, which will be described next.

A display screen 601 is, for example, a cathode ray tube display screen, a TFT liquid crystal display screen, or a screen of a display apparatus incorporated in glasses to be worn on a human body, and it allows a person to visually recognize information from the display apparatus. Again, although the periphery of the display screen 601 is shown in the figure as being the outermost frame of the display device, the frame may be displayed in the display device.

A one-touch frame 602 has the same function as the one-touch window described earlier, and it is a frame for displaying at least an image 608. When the operator of the terminal of the information display apparatus specifies the image 608 using operation means not shown, the one-touch frame 602 displays at least one item of related information so that a process based on the information can be activated, and if a plurality of items exists, the items are selected so that a process based on the information can be activated. That is, the one-touch frame 602 on the display screen 601 functions as a special management area for guiding a particular operation based on the image 608, and it allows the operator of the terminal to execute a new operation based on the image displayed in the area.

An information providing frame 603 has the same function as the information providing window described earlier, and it is a frame for displaying at least images 605 and 606, etc. When the operator of the terminal of the information display apparatus specifies an image displayed in the frame using operation means not shown, a new image is added to the one-touch frame 602 based on the operation.

The image to be added and displayed at this time may be the image that has been specified and displayed in the information providing frame 603, and may be replaced with another image as needed. The information providing frame 603 may display text information 607, etc. as well as an image.

That is, the information providing frame 603 on the display screen 601 functions as a special management area (first management area) for drawing attention of the operator of the terminal by displaying an image, etc. and for guiding the operator of the terminal to execute an operation for specifying an image for registration in the one-touch frame 602.

With regard to the specifying operation and registration in the one-touch frame 602 by the operator of the display/operation terminal, if a pointing device such as a mouse is provided to operation means, a user interface technique called drag-and-drop may be used, in which an image to be registered is specified by the pointer and is moved to and dropped in the one-touch frame 602.

A content display screen 604 is a frame for displaying content such as a movie in a digital broadcast, and it is an area used for displaying information desired by the operator of the terminal. The content is not limited to motion picture or the like, and may include any information that is transferred by stimulating human sense of vision, such as still picture and teletext broadcast information.

(1-4. Communications Between First Management Area and Second Management Area)

Communications of related information, etc. take place between a first management area 104 and a second management area 105, which are achieved by communications between processes or threads. Generally, communications between processes or threads can be achieved by various methods. For example, communications can be executed by a control unit that controls two areas, using a common memory space or a common file. Alternatively, data communications between the first management area and the second management area can also be executed by creating a new process and establishing communications with the process based on COM (Component Object Model) technology.

2. First Embodiment of the Present Invention (2-1. System Configuration According to the First Embodiment)

Figure 1:
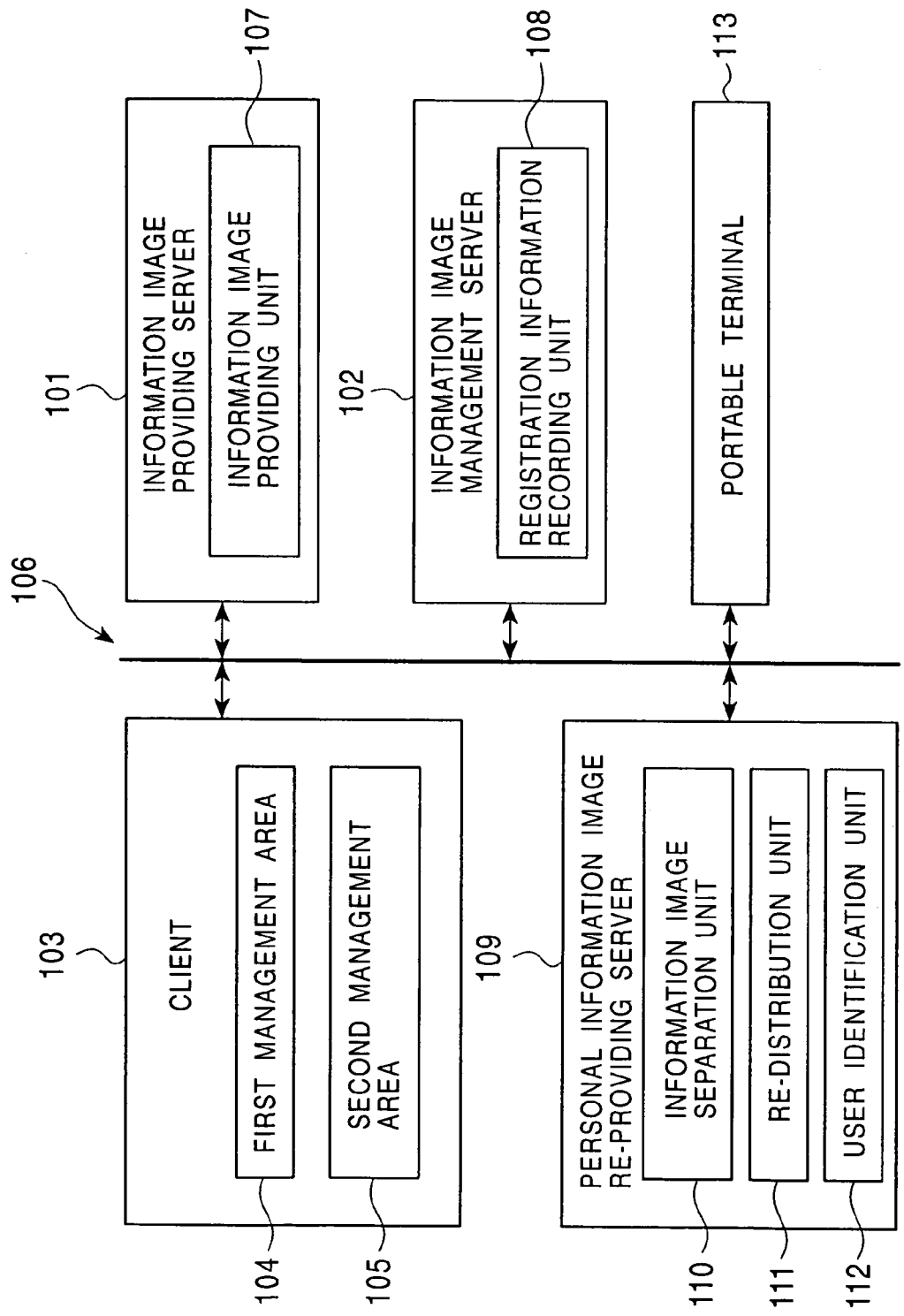
FIG. 1 is an overall system diagram showing a first embodiment of an information providing apparatus according to the present invention.

Now, the overall system configuration of a first embodiment of the present invention will be described with reference to FIG. 1.

The system includes an information image providing server 101, an information image management server 102, a client 103, a personal information image re-providing server 109, and a portable terminal 113, each operating in connection with a network 106.

Network 106

The network 106 operates so as to allow devices connected thereto, whether by wire or by wireless, to exchange information with target devices respectively when a session is established therewith. Thus, although the network 106 is shown as connected by a single backbone line in FIG. 1, it may be implemented by a combination of a plurality of networks via gateways, like the Internet. Furthermore, the connection need not be a direct connection to what is called a backbone, and may be a temporary connection based on PPP as long as information can be exchanged between devices when a session is established therebetween.

(2-2. Information Image Providing Server 101)

The information image providing server 101 is connected to the network 106. When a request for providing information is received via the network, in response to the request, the information image providing server 101 transmits recorded information to the source of the request. More specifically, information image is recorded internally, and when a request for providing the information image is received via the network, the information image is provided to the source of the request.

The information image is provided by an information providing unit 107 of the information image providing server 101.

Without limitation, in this embodiment, an information image provided by the server 101 is supposed to be an information image specified in advance in a campaign, etc.

(2-3. Information Image Management Server 102)

The information image management server 102 is connected to the network 106. The information image management server 102 includes a registration information recording unit 108, which includes a table shown in FIG. 9.

The registration information recording unit 108 executes communications with the client 103, which is directly or indirectly connected for communications with the information image providing server 101. "Directly or indirectly" suggests that connection to the network 106 may be direct or via a buffer or the like regardless of whether the connection is by wire or by wireless, and a gateway or the like may be interposed in the network, as long as mutual communications are allowed. That is, at least, a notification is issued from the second management area 105 when an information image that has been in the first management area 104 of the client 103 is registered in the second management area 105, at which time the registration information recording unit 108 determines, based on the notification, at least an ID 1001 for individually identifying the client 103 (hereinafter referred to as a client ID) and registration information image identification information (i.e., an information image ID) 1002 for identifying a registered information image (such as a file name of the information image), recording these items as a single record. Thus, by a query using an ID of a client, the registration information recording unit 108 functioning as a database allows recognition as to what information image has been registered in the second management area 105 by the client. Furthermore, by a query using the information image identification information 1002, the registration information recording unit 108 allows recognition as to which client has registered the information image in the second management area 105.

(2-4. Client 103)

The client 103 is an information processing apparatus, such as a personal computer, a digital television, or a PDA (Personal Digital Assistance), connected to the network 106. The connection may be a direct connection by wire, or by wireless, etc. As described earlier, the client internally generates functions of the first management area and the second management area, which are usually implemented by a program.

Now, the client 103 will be described in detail with reference to FIG. 8.

An image display unit 901 is, for example, a browser such as Internet Explorer of Microsoft Corporation or Netscape Navigator of Netscape Communications Corporation. When downloading of information on a particular server is instructed by an operator, the image display unit 901 establishes a logical connection with the information image providing server 101 via the network according to the instruction, obtains the information, and displays the information in the first management area 104.

The second management area 105 may be executed by constructing, for example, an information image obtaining unit 904, an information image recording unit 905, a related information obtaining unit 906, an image display configuration unit 907, an image specification unit 908, and an operation determination unit 909.

A communication COM 902 is means for implementing communications between processes (or threads, hereinafter the same) using COM, which is a function of an OS. For example, in response to a user interface operation such as drag-and-drop, the communication COM 902 serves to transmit information from a dragged process to a dropped process.

The information image obtaining unit 904 is connected to the network, and it receives an information image from the information image management server 102, transferring the information image to the information image recording unit 905 at a subsequent stage.

The information image can be received by one of two methods.

In a first method, the information image management server 102 is queried, by polling, as to whether information image recorded in the information image recording unit 905, which will be described below, has been updated, and the information is obtained in the event of any update.

In a second method, based on information recorded in the registration information recording unit 108 of the information image management server 102, an information image is transmitted to and received by a client of information image, managed in the information image management server 102.

The information image recording unit 905 records an information image in which image information and related information are integrated as a single operation unit, transmitted from the communication COM 902 or the information image obtaining unit 904. The recording may be such that, instead of recording as an information image, image information and related information are recorded in separate memories in association with each other. Furthermore, when an operation for registering an information image is performed, for example, by a drag-and-drop operation from the first management area 104 to the second management area 105, the information image recording unit 905 notifies a particular server, via the related information obtaining unit 906, that the information image has been registered in the second management area 105.

The related information obtaining unit 906 is connected to the information image recording unit 905, and it obtains only related information from an information image recorded in the information image recording unit 905.

The image display configuration unit 907 is connected to the information image recording unit 905, and it displays all or selected information images recorded in the information image recording unit 905 as a display from the second management area 105. That is, the operator is allowed to recognize images associated with information images through the one-touch frame (one-touch window) described earlier.

The image specification unit 908 allows an operator to specify an image displayed in the second management area 105 by a function of the OS interface 903 so that an information image corresponding to the image can be specified.

The operation determination unit 909 is connected to the image specification unit 908 and to the related information obtaining unit 906, and it executes an operation based on related information included in the information image specified by the operator.

Figure 8:
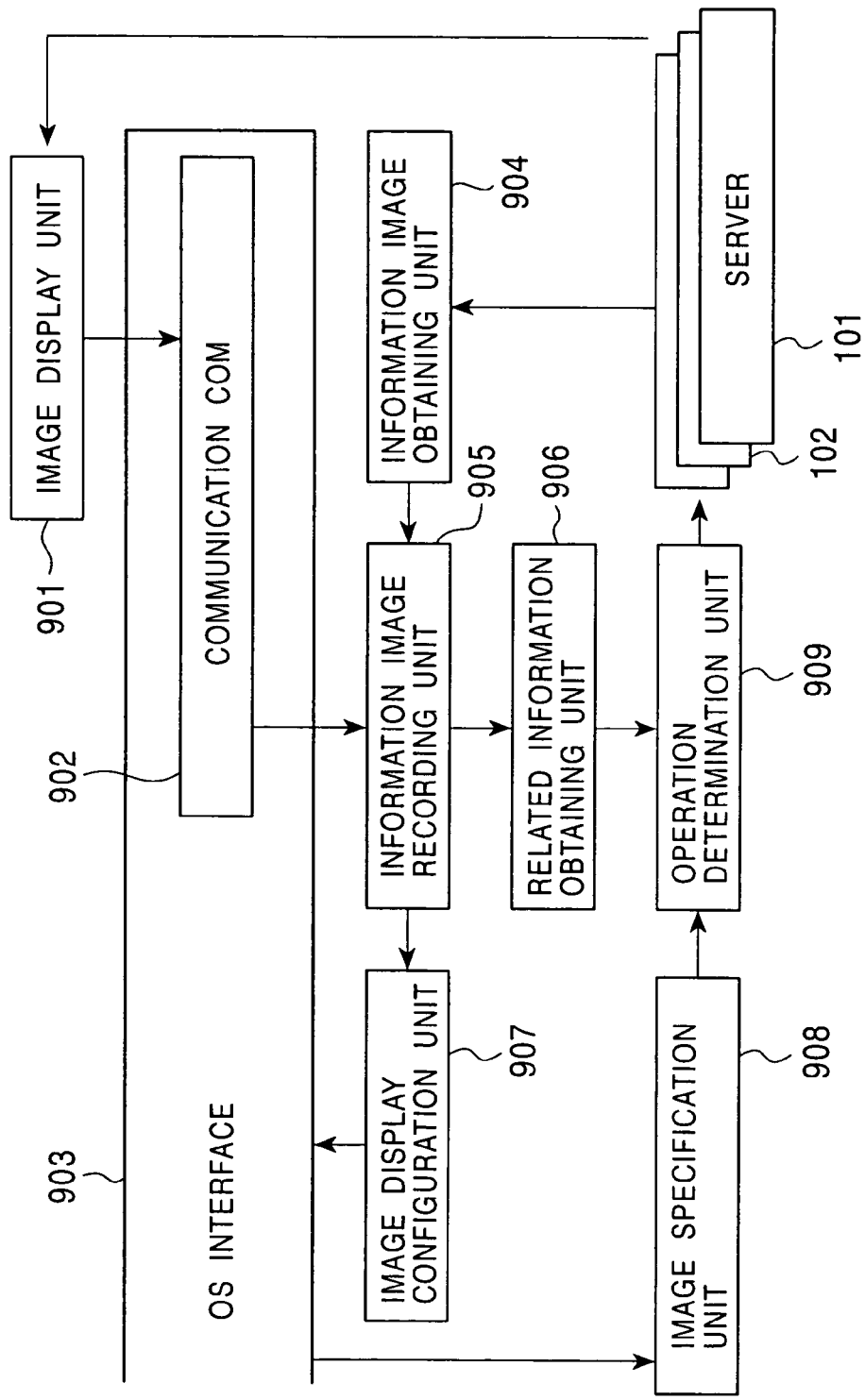
FIG. 8 is a construction diagram of a client according to the first embodiment.

Next, operation in relation to the client constructed as shown in FIG. 8 will be described.

An operator of the client obtains page information including an information image from the information image providing server 101, and displays the page information in the image display unit 901. At this time, when a browser is used as the image display unit 901, a Web page of the server is displayed based on HTTP protocol; however, other browsers or different protocols may be used as long as an information image can be obtained from the server and displayed.

When the operator of the client 103 determines an image to be recorded in the second management area 105 with reference to the displayed image, the operator performs an operation for moving the image to the second management area 105, for example, by drag-and-drop. At this time, the image that is dragged and dropped, since it is an information image, is recorded in the information image recording unit 905 via the communication COM 902. Furthermore, at this time, by operation of the related information obtaining unit 906, the information image management server 102 is notified via the operation determination unit 909 that the information image has been registered in the second management area 105. Operation of the information image management server 102 at this time will be described later.

The information image associated with the second management area 105, recorded in the information image recording unit 905, is displayed for the operator of the client via the OS interface 903 by operation of the image display configuration unit 907. Then, the operator of the client performs an operation based on related information recorded in the displayed information image so that operation associated with the related information will be executed by operation of the image specification unit 908 and the operation determination unit 909. For example, if a URL of another information image providing server is included as related information, a name of a page associated with the URL is displayed in a pop-up window or the like, prompting import of another information image.

If an instruction for updating an information image to be displayed in the second management area 105 is received from the information image management server 102, the information image obtaining unit 904 is notified of the instruction together with the information image to be updated, whereby an information image recorded in the information image recording unit 905 is added or updated.

(2-5. Personal Information Image Re-providing Server 109)

The personal information image re-providing server 109 is connected to the network 106. When a request for providing information is received from the portable terminal 113 via the network, in response to the request, the personal information image re-providing server 109 transmits image information and related information of a recorded information image to the portable terminal 113 at the source of the request. More specifically, the personal information image re-providing server 109 includes an information image separation unit 110, a re-distribution unit 111, and a user identification unit 112, and it identifies a requestor and transmits separated image information and related information.

As described earlier with reference to FIGS. 6 and 7, an information image is created by embedding related information in the comment extension 705, etc. of image information, for example, in GIF format. Thus, special software (software for operation of the second management area 105 described earlier) is required for reading the information image itself. Thus, display of content of related information is not allowed when an information image is distributed to a mobile phone or the like that does not allow arbitrary application software to be installed thereon.

However, it often occurs that an information image once obtained by the client computer 103 is to be checked again at a visiting place. For example, if information images related to electronic appliances are collected on the client computer 103 at home so that the collected information images can be viewed again while visiting a shopping street of electronic appliances, a sales shop in accordance with intention can be quickly extracted and determined, which is highly convenient.

Accordingly, the personal information image re-providing server 109 according to this embodiment separates an information image obtained by the client computer 103 and registered in the registration information recording unit 108 of the information image management server 102 into image information and related information, and combines and records the image information and the related information in the form of a Web page (corresponding to a distribution format relating to the present invention), and the Web page is re-distributed when a request for providing information is received from a portable terminal such as the portable phone 113.

Information images that can be re-distributed to the mobile phone 113 are those registered in the registration information recording unit 108 of the information image management server 102 via the second management area 105 of the client computer 103. In this system, when a client ID and the information image ID are registered in the registration information recording unit 108 of the information image management server 102 from the second management area 105 of the client 103, the information image is transmitted to the personal information image re-providing server 109.

The transmission of the information image need not be executed simultaneously with registration in the registration information recording unit 108, and may be executed upon an access by the portable terminal 113. However, if the transmission is executed simultaneously with registration in the registration information recording unit 108, advantageously, response time for re-distribution to the portable terminal 113 becomes shorter.

Furthermore, in order to confirm identity between the requestor of providing information and the user of the client 103 when the information image is re-distributed, the personal information image re-providing server 109 includes the user identification unit 112.

The user identification unit 112 prompts the user to enter a client ID and a password on the mobile phone 113 that has accessed, compares these against the registration information recording unit 108 (1001 and 1002 in FIG. 9) of the information image management server 102 for a coinciding information image, and selects only the coinciding information image for distribution.

The re-distribution unit 111 transmits image information and related information of an information image identified by the user identification unit 112 to the portable phone 113 via the network 106.

Figure 12:
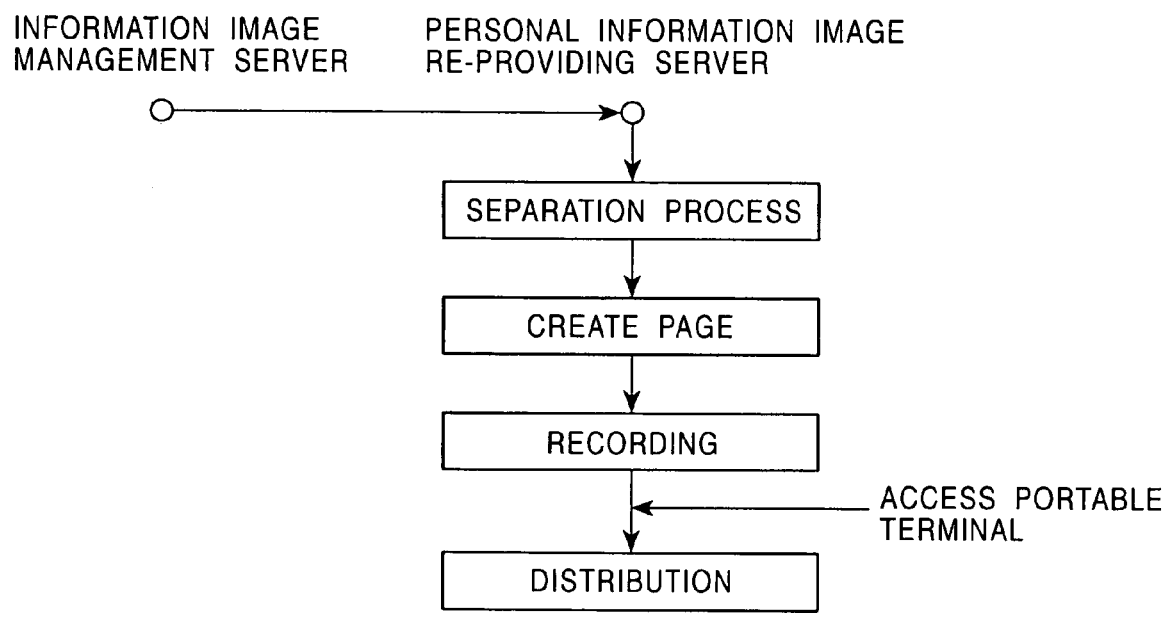
FIG. 12 is a diagram showing an example of timing of a separation process in an information image separation unit according to the first embodiment.
Figure 13:
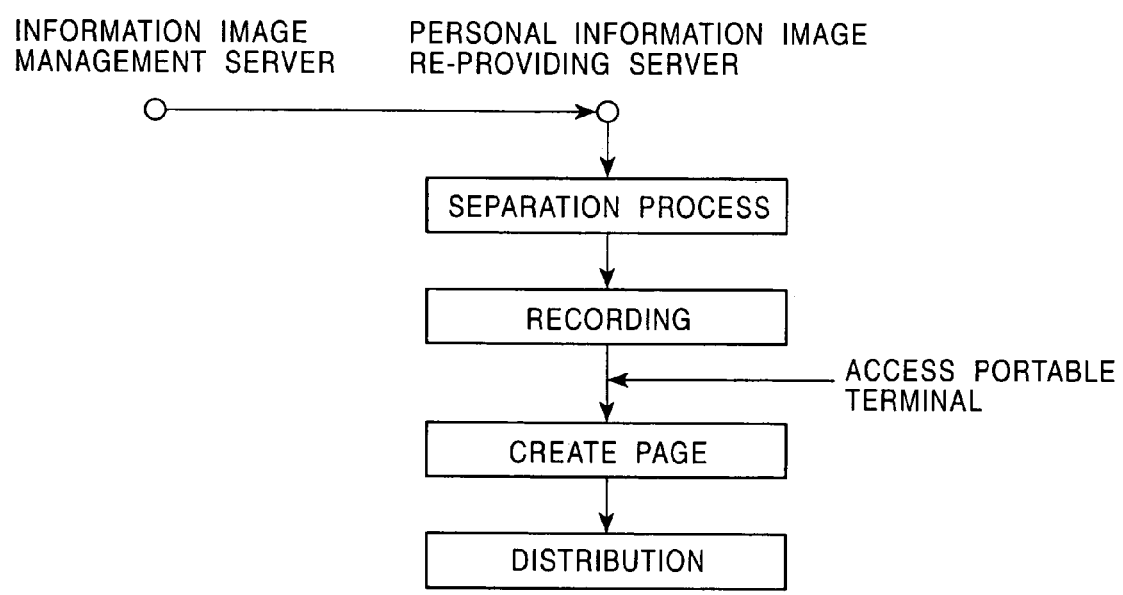
FIG. 13 is a diagram showing another example of timing of the separation process in the information image separation unit according to the first embodiment.
Figure 14:
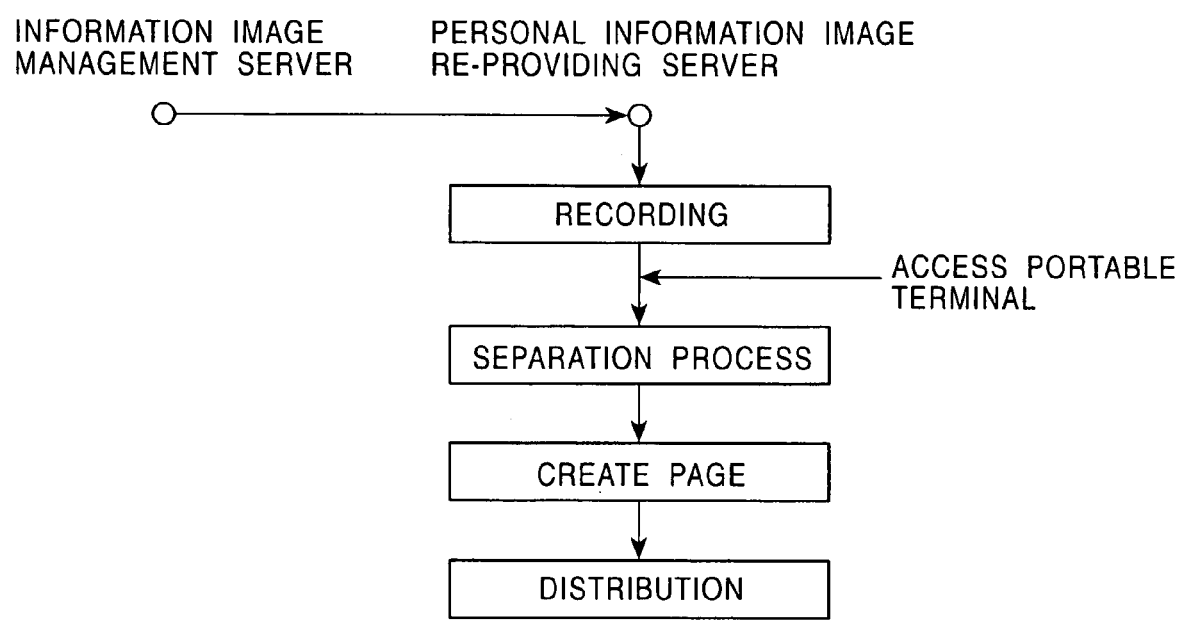
FIG. 14 is a diagram showing another example of timing of the separation process in the information image separation unit according to the first embodiment.

The timing of separating the information image transmitted from the information image management server 102 to the personal information image re-providing server 109 into image information and related information may be selected from various modes as needed. FIGS. 12 to 14 are diagrams showing embodiments of timing of separating an information image.

In the example shown in FIG. 12, when an information image has been transmitted from the information image management server 102 to the personal information image re-providing server 109, the information image is separated into image information and related information, and the image information and related information are combined (created) into a single page (hereinafter also referred to as a Web page) in a distribution format and recorded. When an access is made by the mobile phone 113 in this state, the recorded Web page (in which image information and related information are combined) is distributed to the mobile phone 113. In this example, when an access is made by the mobile phone 113, a Web page is already created and recorded, so that time is required only for distributing the Web page. Thus, advantageously, response time to the mobile phone 113 is short.

In the example shown in FIG. 13, when an information image has been transmitted from the information image management server 102 to the personal information image re-providing server 109, the information image is separated into image information and related information and recorded in the separated form. When an access is made by the mobile phone 113 in this state, the recorded image information and related information are combined (created) into a single page (hereinafter also referred to as a Web page) in a distribution format, which is distributed to the mobile phone 113. In this example, a Web page is created upon an access by the mobile phone 113, so that a Web page in accordance with a display format of the mobile phone 113 can be created. Thus, advantageously, visibility is improved on the mobile phone 113.

In the example shown in FIG. 14, when an information image has been transmitted from the information image management server 102 to the personal information image re-providing server 109, the information image is recorded as it is. When an access is made by the mobile phone 113 in this state, the recorded information image is separated into image information and related information, and the image information and related information are combined into a single Web page, which is distributed to the mobile phone 113. In this example, the information image is recorded as it is, so that storage capacity of the personal information image re-providing server 109 is minimized.

(2-6. Scenario From Registration of Information Image to Re-providing of Personal Information Image)

Figure 10:
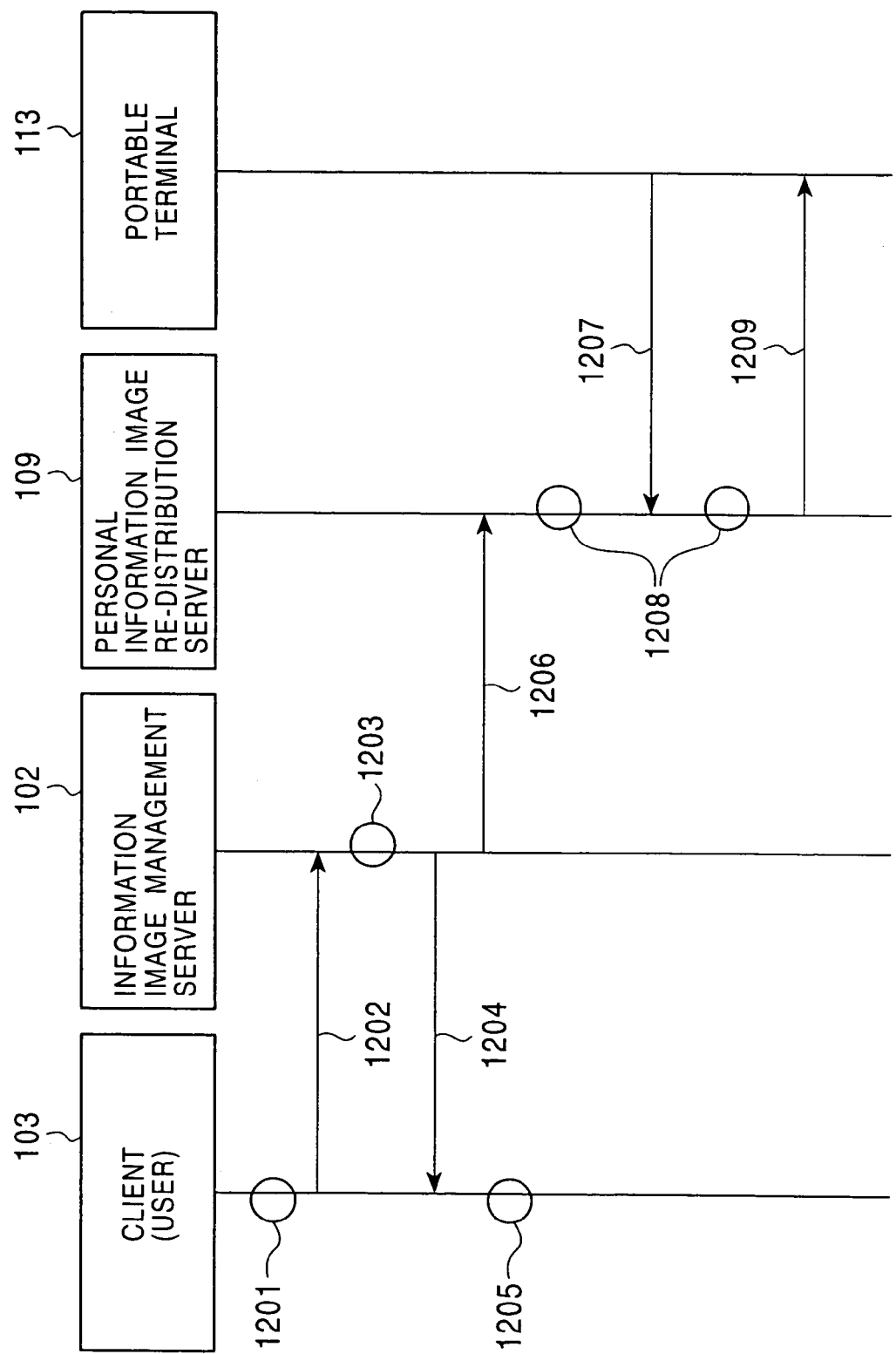
FIG. 10 is a diagram showing a procedure from registration of an information image to re-providing of a personal information image according to the first embodiment.

Next, a scenario from registration of an information image to re-providing of a personal information image will be described with reference to FIG. 10.

The operator of the client 103 moves, by an operation such as drag-and-drop, an information image included in a Web page displayed in the first management area 104 implemented, for example, by Internet Explorer, to the second management area 105 (step 1201). Then, the information image management server 102 is notified by the client 103 of a request for registering the information image, including a client ID, an image information ID, etc. (step 1202). Upon receiving the request, the information image management server 102 records the client ID, the image information ID, and other information as needed, in the registration information image recording unit 108 (FIG. 9) (step 1203), and returns a message to the client 103 that registration of the information image is complete (step 1204). Accordingly, by performing a predetermined operation in relation to the information image at the client 103, various services, etc. based on the related information of the information image can be received (step 1205).

Furthermore, when the information image management server 102 has returned the message to the client 103 that registration of the information image is complete (step 1204), the information image is transmitted to the personal information image re-providing server 109 (step 1206).

Upon receiving the information image, the personal information image re-providing server 109 performs separation, creation of a page, and recording in one of the various modes described above (step 1208), and upon an access by the portable terminal 113 (step 1207), the personal information image re-providing server 109 distributes Web page information to the portable terminal 113 (step 1209). At this time, first, a client ID and a password are entered from the portable phone 113, a client is identified by the user identification unit 112 of the personal information image re-providing server 109, and an information image of the client is specified. Then, selection menu screen information of the specified information image, for example, a list of information images if a plurality of information images of the client is registered, is transmitted to the portable phone 113. A desired information image is selected on the portable phone 113, and then the Web page is distributed.

In this example, information to be distributed to the mobile phone 113 is, without limitation, a ticket, a coupon, music, etc., and these items may be provided as related information itself, or an access key to a server that provides these information items may be provided as related information.

3. Second Embodiment of the Present Invention (3-1. System Configuration According to the Second Embodiment)

Figure 15:
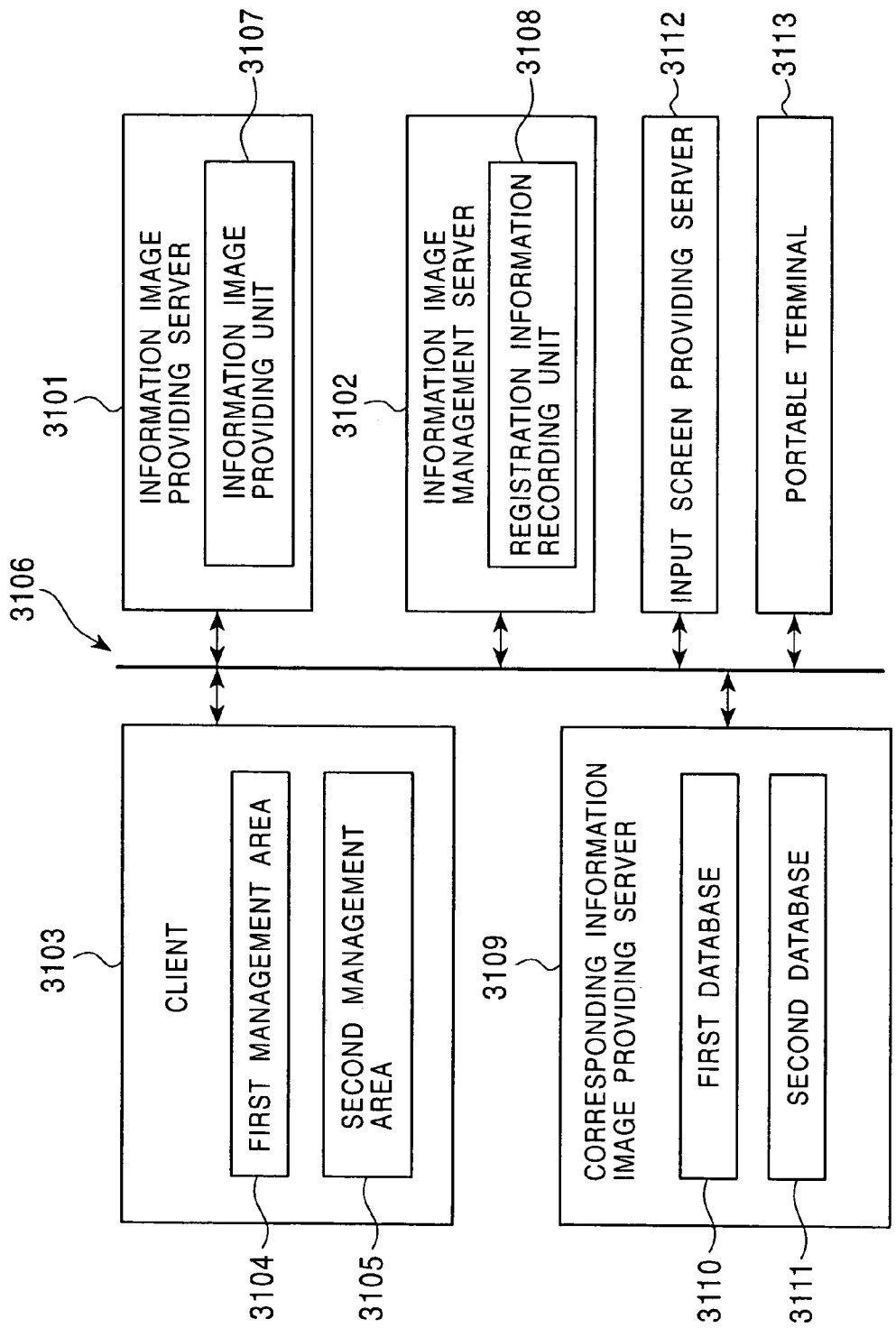
FIG. 15 is an overall system diagram showing a second embodiment of an information providing apparatus according to the present invention.

Now, the overall system configuration of a second embodiment of the present invention will be described with reference to FIG. 15.

The system includes an information image providing server 3101, an information image management server 3102, a client 3103, a corresponding information image providing server 3109, an input screen providing server 3112, and a portable terminal 3113, each operating in connection with a network 3106.

(3-2. Network 3106)

The network 3106 operates so as to allow devices connected thereto, whether by wire or by wireless, to exchange information with target devices respectively when a session is established therewith. Thus, although the network 3106 is shown as connected by a single backbone line in FIG. 15, it may be implemented by a combination of a plurality of networks via gateways, like the Internet. Furthermore, the connection need not be a direct connection to what is called a backbone, and may be a temporary connection based on PPP as long as information can be exchanged between devices when a session is established therebetween.

(3-3. Information Image Providing Server 3101)

The information image providing server 3101 is connected to the network 3106. When a request for providing information is received via the network, in response to the request, the information image providing server 3101 transmits recorded information to the source of the request. More specifically, information image is recorded internally, and when a request for providing the information image is received via the network, the information image is provided to the source of the request.

The information image is provided by an information providing unit 3107 of the information image providing server 3101.

Without limitation, in this embodiment, an information image provided by the server 3101 is supposed to be an information image in which an image symbolizing an information provider (information providing entity) is set as image information and in which, for example, a URL of a Web site managed by the information provider is set as related information.

(3-4. Information Image Management Server 3102)

The information image management server 3102 is connected to the network 3106. The information image management server 3102 includes a registration information recording unit 3108, which includes a table shown in FIG. 18.

The registration information recording unit 3108 executes communications with the client 3103, which is directly or indirectly connected for communications with the information image providing server 3101. "Directly or indirectly" suggests that connection to the network 3106 may be direct or via a buffer or the like regardless of whether the connection is by wire or by wireless, and a gateway or the like may be interposed in the network, as long as mutual communications are allowed. That is, at least, a notification is issued from a second management area 3105 when an information image that has been in a first management area 3104 of the client 3103 is registered in the second management area 3105, at which time the registration information recording unit 3108 determines, based on the notification, at least an ID 3301 for individually identifying the client 3103 (hereinafter referred to as a client ID) and registration information image identification information (i.e., an information image ID) 3302 for identifying a registered information image (such as a file name of the information image), recording these items as a single record. Thus, by a query using an ID of a client, the registration information recording unit 3108 functioning as a database allows recognition as to what information image has been registered in the second management area 3105 by the client. Furthermore, by a query using the information image identification information 3302, the registration information recording unit 3108 allows recognition as to which client has registered the information image in the second management area 3105.

The information image management server 3102 is allowed to communicate data with the information image providing server 3101, the corresponding information image providing server 3109, and the input screen providing server 3112 connected to the network 3106, and it has the function of registering a new information image in the second management area 3105 of the client 3103 or updating an information image already registered in the second management area 3105 in the event of any update.

(3-5. Client (Information Terminal) 3103)

The client 3103 is an information terminal (information processing apparatus), such as a personal computer, a digital television, or a PDA (Personal Digital Assistance), connected to the network 3106. The connection may be a direct connection by wire, or by wireless, etc. As described earlier, the client internally generates functions of the first management area 3104 and the second management area 3105, which are usually implemented by a program.

Now, the client 3103 will be described in detail with reference to FIG. 17.

An image display unit 3201 is, for example, a browser such as Internet Explorer of Microsoft Corporation or Netscape Navigator of Netscape Communications Corporation. When downloading of information on a particular server is instructed by an operator, the image display unit 3201 establishes a logical connection with the information image providing server 3101 via the network according to the instruction, obtains the information, and displays the information in the first management area 3104.

The second management area 3105 may be executed by constructing, for example, an information image obtaining unit 3204, an information image recording unit 3205, a related information obtaining unit 3206, an image display configuration unit 3207, an image specification unit 3208, and an operation determination unit 3209.

A communication COM 3202 is means for implementing communications between processes (or threads, hereinafter the same) using COM, which is a function of an OS. For example, in response to a user interface operation such as drag-and-drop, the communication COM 3202 serves to transmit information from a dragged process to a dropped process.

The information image obtaining unit 3204 is connected to the network, and it receives an information image from the information image management server 3102, transferring the information image to the information image recording unit 3205 at a subsequent stage.

When an information image has been updated, the information image can be received by one of two methods.

In a first method, the information image management server 3102 is queried, by polling, as to whether information image recorded in the information image recording unit 3205, which will be described below, has been updated, and the information is obtained in the event of any update.

In a second method, based on information recorded in the registration information recording unit 3108 of the information image management server 3102, an information image is transmitted to and received by a client of information image, managed in the information image management server 3102.

Also, when an information image that is to be newly registered has been created, the information image can be received by one of two methods.

In a first method, the information image management server 3102 is queried, by polling, as to whether an information image that is to be newly registered has been created, and the information is obtained if any has been created.

In a second method, at a time when an information image that is to be newly registered has been created at the information image management server 3102, the information image is transmitted to and received by the client 3103 to which the information image is to be transferred.

The information image recording unit 3205 records an information image in which image information and related information are integrated as a single operation unit, transmitted from the communication COM 3202 or the information image obtaining unit 3204. The recording may be such that, instead of recording as an information image, image information and related information are recorded in separate memories in association with each other. Furthermore, when an operation for registering an information image is performed, for example, by a drag-and-drop operation from the first management area 3104 to the second management area 3105, the information image recording unit 3205 notifies a particular server, via the related information obtaining unit 3206, that the information-image has been registered in the second management area 3105.

The related information obtaining unit 3206 is connected to the information image recording unit 3205, and it obtains only related information from an information image recorded in the information image recording unit 3205.

The image display configuration unit 3207 is connected to the information image recording unit 3205, and it displays all or selected information images recorded in the information image recording unit 3205 as a display from the second management area 3105. That is, the operator is allowed to recognize images associated with information images through the one-touch frame (one-touch window) described earlier.

The image specification unit 3208 allows an operator to specify an image displayed in the second management area 3105 by a function of the OS interface 3203 so that an information image corresponding to the image can be specified.

The operation determination unit 3209 is connected to the image specification unit 3208 and to the related information obtaining unit 3206, and it executes an operation based on related information included in the information image specified by the operator.

Figure 17:
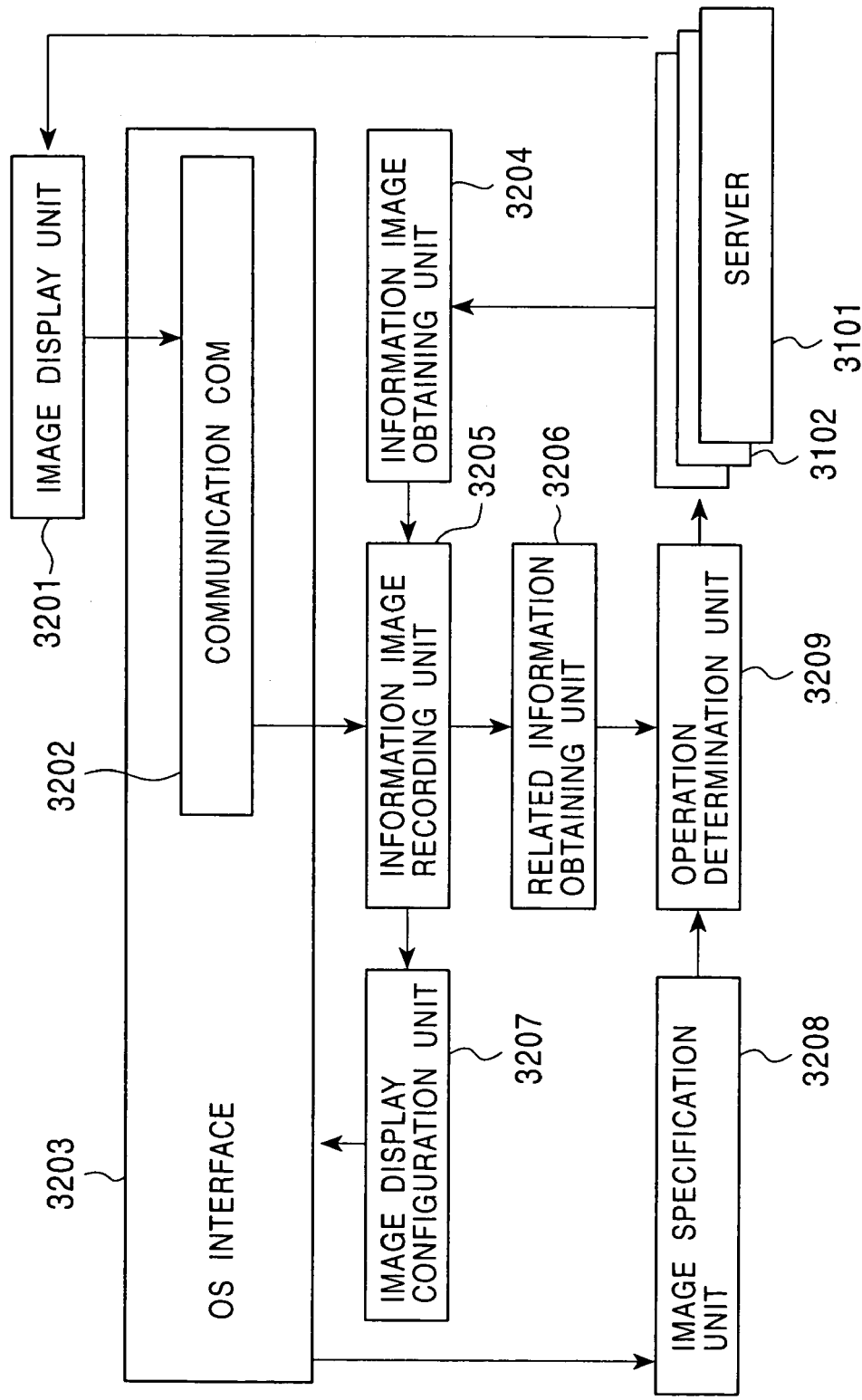
FIG. 17 is a construction diagram of a client according to the second embodiment.

Next, operation in relation to the client constructed as shown in FIG. 17 will be described.

An operator of the client obtains page information including an information image from the information image providing server 3101, and displays the page information in the image display unit 3201. At this time, when a browser is used as the image display unit 3201, a Web page of the server is displayed based on HTTP protocol; however, other browsers or different protocols may be used as long as an information image can be obtained from the server and displayed.

When the operator of the client 3103 determines an image to be recorded in the second management area 3105 with reference to the displayed image, the operator performs an operation for moving the image to the second management area 3105, for example, by drag-and-drop. At this time, the image that is dragged and dropped, since it is an information image, is recorded in the information image recording unit 3205 via the communication COM 3202. Furthermore, at this time, by operation of the related information obtaining unit 3206, the information image management server 3102 is notified via the operation determination unit 3209 that the information image has been registered in the second management area 3105. Operation of the information image management server 3102 at this time will be described later.

The information image associated with the second management area 3105, recorded in the information image recording unit 3205, is displayed for the operator of the client via the OS interface 3203 by operation of the image display configuration unit 3207. Then, the operator of the client performs an operation based on related information recorded in the displayed information image so that operation associated with the related information will be executed by operation of the image specification unit 3208 and the operation determination unit 3209. For example, if a URL of another information image providing server is included as related information, a name of a page associated with the URL is displayed in a pop-up window or the like, prompting import of another information image.

If an instruction for registering an information image that is to be newly registered in the second management area 3105 or an instruction for updating an information image to be displayed in the second management area 3105 is received from the information image management server 3102, the information image obtaining unit 3204 is notified of the instruction together with the information image to be newly registered or the information image to be updated, whereby the information image is added to the information image recording unit 3205 or a recorded information image is updated.

(3-6. Corresponding Information Image Providing Server 3109)

The corresponding information image providing server 3109 is a storage system connected to the network 3106, and it includes a first database 3110 and a second database 3111.

In the first database 3110, information image IDs are set correspondingly to a plurality of provider IDs, as shown in FIG. 16A. The provider IDs are identification information for individually identifying a plurality of information providers (information providing entities) that distribute information using the information providing system according to this embodiment, and are configured of codes that can be input from the portable terminal 3113, such as numerals, characters, and symbols. The provider IDs may be configured, for example, by numerals having eight digits. With regard to the provider IDs, in the case of an information provider having a plurality of shops, etc., a single ID may be generally assigned, or an ID may be assigned for each shop or each group of a plurality of shops, which is registered in the database 3110. The information image ID is identification information (such as a file name of the information image) for distinguishing the information image from other information, and it is identification information of an information image managed by the information image management server 3102. The information image ID associated with each provider ID need not be limited to only one information image ID, and a plurality of information image IDs may be registered for each provide ID.

In the second database 3111, client IDs are set correspondingly to a plurality of mobile terminal IDs, as shown in FIG. 16B. The mobile terminal IDs are identification information for identifying a plurality of mobile terminals 3113 from other mobile terminals. For example, if the mobile terminals 3113 are mobile phones (cellular phones., PHSs, etc.), the mobile terminal IDs are configured of phone numbers, etc. of the phones. The client IDs are identification information for identifying the clients 3103 managed by the information image management server 3102 from other clients. The corresponding relationship between the mobile terminal IDs and the client IDs may be such that a single mobile terminal ID is registered for a single client ID, a plurality of mobile terminal IDs is registered for a single client ID, a single mobile terminal ID is registered for a plurality of client IDs, or a plurality of mobile terminal IDs is registered for a plurality of client IDs.

As will be described later, the databases 3110 and 3111 are referenced mainly when the information image management server 3102 newly registers an information image in the second management area 3105 of the client 3103.

(3-7. Input Screen Providing Server 3112 and Mobile Terminal 3113)

Figure 19:
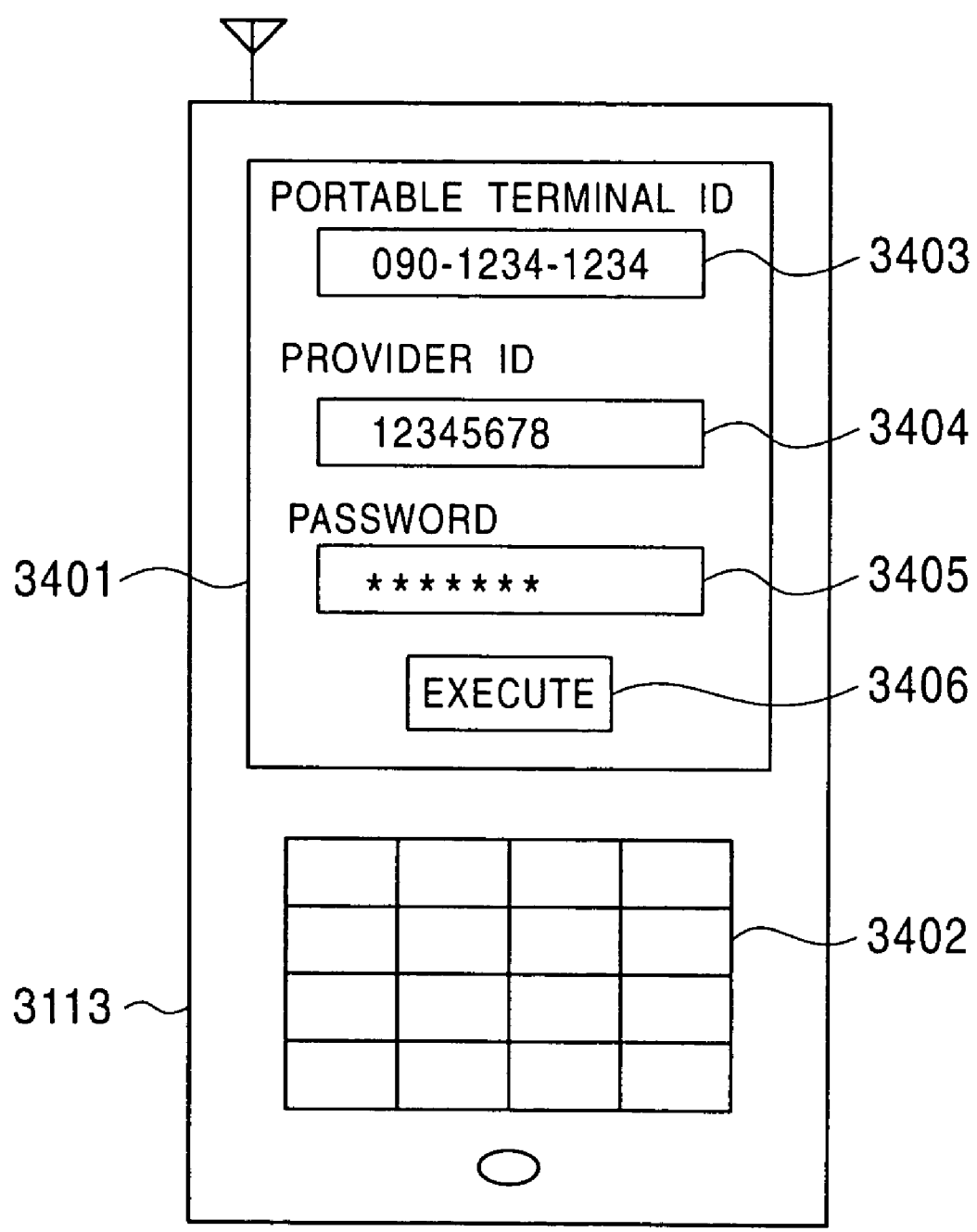
FIG. 19 is a diagram showing the construction of a portable terminal and an input screen for an information transfer service according to the second embodiment.

The mobile terminal 3113 is an information terminal (notebook computer, PDA, etc.) that can be carried by a user, or a mobile phone (cellular phone, PHS, etc.) that is allowed to communicate directly or indirectly via the network 3106. Without limitation, in this embodiment, the mobile terminal 3113 is supposed to be a mobile phone having a display 3401 and a keyboard 3402, as shown in FIG. 19, and capable of accessing an arbitrary Web page substantially the same as an ordinary personal computer, for example, a mobile phone that supports i-mode, which is an Internet service provided for cellular phones by NTT DoCoMo, Inc.

The input screen providing server 3112 is connected to the network 3106, and it provides, in response to an access by the mobile terminal 3113 via the network, predetermined input screen information for a service for transferring an information image. The service for transferring an information image is a characteristic service achieved by the present invention, in which a new information image is registered in a second management area 3105 of a predetermined client 3103 when a predetermined instruction is received from the mobile terminal 3113. The input screen providing server 3112 provides an interface for inputting information required for using the service.

The input screen information can be provided using an ordinary Web page with sections for inputting predetermined information if access to ordinary Web pages is allowed as in the case of the mobile terminal 3113 in this embodiment. In this embodiment, three input sections, namely, an input section 3403 for mobile terminal ID, an input section 3404 for provider ID, and an input section 3405 for password, are provided, as shown in FIG. 19. Instead of mobile terminal ID, client ID may be input. Password is input for the purpose of security in order to prevent unauthorized access by a third person. However, input of password may be omitted. Furthermore, input of mobile terminal ID may be omitted if it is automatically recognized at the time of communications with the mobile terminal 3113. 3406 is an execution button, and when it is operated after entering required items, the information image management server 3102 starts a process of transferring an information image.

The input screen providing server 3112 in this embodiment is connected to the network 3106, and it allows access from arbitrary information terminals (not limited to the mobile terminal 3113) connected to the network 3106. Accordingly, access can be made from another information terminals and required items for receiving service of transferring information can be input so that an information image can be transferred to another information terminal (client 3103).

If access to the service by information terminals other than the mobile terminal 3113 is prohibited, it suffices for the input screen providing server 3112 to be capable of communications with at least the information image management server 3102 and the mobile terminal 3113, and thus access by other information terminals, etc. may be prohibited.

Since the mobile terminal 3113 need not be allowed to communicate with servers, etc. other than the input screen providing server 3112, the mobile terminal 3113 may be connected to the input screen providing server 3112 via a network other than the network 3106. In that case, communications between the mobile terminal 3113 and the input screen providing server 3112 need not be performed using a Web page, etc., and the required items described earlier may be input by operating the keyboard 3402 in accordance with speech guidance. Depending on cases, a connection may be formed with an operator (person) via a telephone network to instruct the operator by speech to input required items.

(3-8. Scenario From Finding of Provider ID to Registration of Information Image in the Second Management Area 3105 of the Client 3103)

Next, a scenario from finding of a provider ID by a user to registration of an information image will be described with reference to FIG. 20.

First, as a presupposition, an information provider that provides information using the information providing system of this embodiment is assigned a provider ID that serves as identification information thereof. Furthermore, an information image regarding the information provider is registered in the information image management server 3102 (or the information image providing server 3101), and an information image ID associated with the information image is registered in the first database 3110 (FIG. 16A) of the corresponding information image providing server 3109 correspondingly to the provider ID. The information provider displays the provider ID at an entrance of its own shop (such as a store, restaurant, sales office, factory, advertisement facility) or other places so that the provider ID can be readily seen from outside.

The corresponding relationship between the client ID and the mobile terminal ID in relation to the operator of the client 3103, i.e., the user of the mobile terminal 3113, is registered in advance in the second database 3111 (FIG. 16B) of the corresponding information image providing server 3109.

Let it be supposed that the user finds a shop (e.g., a restaurant) of the information provider while walking around a street corner, etc., and becomes interested and wishes to know content of a service provided by the information provider. In this case, the user accesses a Web page regarding the service for transferring an information image, described earlier, of the input screen providing server 3112 using its own mobile phone 3113 (step 3501). The address of the Web page can be registered in advance in the mobile phone 3113 using a bookmark function or the like.

The input screen providing server 3112 transmits required information of the requested input page to the mobile phone 3113 (step 3502). Then, the user enters required items displayed on the mobile phone 3113, i.e., enters a mobile terminal ID, a provider ID, and a password, and operates an execution button after confirmation. Accordingly, the information items are transmitted to the input screen providing server 3112 (step 3503), and an instruction for transferring an information image, accompanied with the information items, is transmitted to the information image management server 3102 (step 3504).

The information image management server 3102 accesses the second database 3111 of the corresponding information image providing server 3109 to receive a client ID corresponding to the mobile terminal ID included in the transfer instruction, and also accesses the first database 3110 to receive an information image ID corresponding to the provider ID (steps 3505 and 3506). The information image management server 3102 executes a process for registering an information image (file) corresponding to the information image ID received from the corresponding information image providing server 3109 in the second management area 3105 of the client 3103 corresponding to the client ID received from the corresponding information image providing server 3109, whereby the information image is transmitted to the client 3103 (step 3507). The client 3103 notifies the information image management server 3102 that the information image has been properly registered (step 3508), and the information image management server 3102 records predetermined items to be recorded in the registration information recording unit 3108, and the series of information transfer processes is exited.

The user that has entered the provider ID operates the client 3103 that serves as its own personal computer at home, and then the information image regarding the information provider is displayed in the second management area 3105. For example, the user places a cursor on the information image using a mouse and right-clicks thereon, whereby a plurality of menus that is set as related information is displayed. The user then places the cursor on a desired menu and left-clicks thereon, whereby a process in accordance with the menu is executed. For example, if the menu is a URL of a Web page of the information provider, a browser such as Internet Explorer is activated and content of the Web page is displayed. Accordingly, the user is allowed to readily obtain required information.

4. Other Embodiments

The embodiments described hereinabove are intended to facilitate understanding of the present invention, and not intended to limit the present invention. Thus, the components disclosed in the embodiments described above are intended to cover any design modifications and equivalents within the technical scope of the present invention.

As an example, in addition or alternatively to the first embodiment described above, information may be provided to the mobile terminal 113 using what is called push function. Push function serves to efficiently provide information from a Web server to a client. For example, when the client 103 moves a particular information image to the second management area 105 and the information image is registered in the information image management server 102, the information image management server 102 issues an instruction to the information image providing server 101 for transmitting an information image (e.g., an advertisement that a campaign is going on) related to the particular information image to the client 103. Accordingly, the client 103 is provided with the information image it has downloaded and also the information image related thereto.

In the information image management server 102 having the push function, a client management database configured as shown in FIG. 11 is provided in the registration information recording unit 108, in which client IDs 2001, personal information 2002, mobile phone numbers 2003, and other information 2004 are recorded. When a related information image has been distributed from the information image providing server 101 to the client 103 by the push function, in parallel thereto, an electronic mail to the effect that the related information image has been distributed is transmitted to the mobile phone 113 of the client. Accordingly, the client is allowed to view the information image immediately when the client computer 103 is activated, so that the information image providing server 101 achieves improved effect of advertisement.

Method of billing for the information providing service to the mobile terminal 113 using a Web page in the first embodiment is not particularly limited. For example, an access counter is provided on the personal information image re-providing server 109 and accesses by the mobile terminal 113 are counted so that the client can be billed. If a single client has a plurality of mobile terminals 113 and Web pages are distributed to the plurality of mobile terminals 113, an amount multiplied by the number of mobile terminals is charged.

Also, method of the service of transferring information regarding an information provider from the mobile terminal 113 to the client 103 is not particularly limited. For example, an access counter for each client is provided on the information image management server 102 and transfer requests from the mobile terminal 113 is counted so that the client can be billed. If a single user has a plurality of information terminals (clients 103) and instructs transfer of information from the mobile terminal 113 to each of the information terminals, an amount multiplied by the number of the information terminals is charged.

Furthermore, for example, although the first database 110 and the second database 111 in the second embodiment described above is managed by the corresponding information image providing server 109 serving as a storage system in the second embodiment described above, a storage device of the information image management server 102 may be used for management.

Furthermore, if the arrangement is made such that the client ID is input directly from the mobile terminal 113, the second database 111 of the corresponding information image providing server 109 may be omitted. This is allowed by modifying the section 1103 (FIG. 11) for inputting mobile terminal ID in an input screen provided by the input screen providing server 112 into a section for inputting client ID.

Although the second embodiment has been described in relation to a case where an information image in which image information and at least related information defining a unique process are integrated as a single operation unit is used as information regarding an information provider that is to be transferred from the mobile terminal 113 to the client 103, the present invention is not limited thereto, and the information may be image information, text information, audio information, etc.

The functions implemented by the servers in the embodiments may be integrated so as to be implemented by a single or a plurality of servers, or further divided so as to be implemented by a larger number of servers.

INDUSTRIAL APPLICABILITY

According to the present invention, an information image once obtained by an information terminal can be re-obtained by a mobile terminal anytime and anywhere. Accordingly, an information image providing apparatus that allows various information such as a ticket, a coupon, or music to be obtained by the mobile terminal at a desired time and place, based on the re-obtained information itself or the re-obtained information, can be provided.

Furthermore, according to the present invention, task of accessing information on a network related to information obtained at a street corner, etc. is facilitated so that information will be provided and used more efficiently. Accordingly, an information image providing apparatus that serves to further promote network-based commercial transactions, etc. can be provided.

The invention claimed is:

1. An information providing apparatus for distributing data comprising:
   a memory unit for storing an information image comprising image information and related information defining a unique process, wherein the information image is integrated as a single operational unit;
   an input unit for receiving a request to distribute the information image;
   a distribution unit for distributing the information image to an information terminal;
   a user identification unit for identifying a user of the information terminal;
   a registration information recording unit for registering the user in association with the information image;
   an information image separation unit for separating the information image into the image information and the related information; and
   a re-distribution unit for re-distributing the separated image information and the related information together as a display page to a portable terminal, only when the user of the information terminal is also the user of the portable terminal, wherein the information terminal and the portable terminal are different terminals.

2. An information providing apparatus according to claim 1, wherein the information image separation unit separates the information image immediately after the information image is distributed to the information terminal, converts the image information and the related information into a distribution format, and records results.

3. An information providing apparatus according to claim 1, wherein the information image separation unit separates the information image immediately after the information image is distributed to the information terminal, records the image information and the related information, and converts the image information and the related information into a distribution format upon receiving a request for distributing the information image from the portable terminal.

4. An information providing apparatus according to claim 1, wherein the information image separation unit records the information image immediately after the information image is distributed to the information terminal, separates the information image upon receiving a request for distributing the information image from the portable terminal, and converts the image information and the related information into a distribution format.

5. An information providing apparatus according to claim 1, comprising
   a registration information recording unit having a database that associates the user of the information terminal with a portable terminal of the user, wherein:
   an instruction is outputted to an information image providing server to provide a second information image, related to the information image, to the portable terminal upon receiving a message that the information image has been distributed to the information terminal,
   the second information image is registered, and
   based on the database, a message is transmitted to the portable terminal that the second information image has been distributed.

6. An information providing apparatus according to claim 1, further comprising:
   first storage means for storing a plurality of information images, each serving as second information, wherein each of the second information is associated with first information that identifies an information distributing entity; and
   information providing means for extracting, in response to a distribution instruction accompanied with first information input from the portable terminal, second information associated with the first information from the first storage means, and for distributing the extracted second information to the information terminal.

7. An information providing apparatus according to claim 6, further comprising
   first input screen providing means for providing the portable terminal with input screen information for inputting the first information and issuing the distribution instruction from the portable terminal.

8. An information providing apparatus according to claim 6, further comprising
   second storage means prestoring third information for identifying an information terminal to which the second information is to be distributed according to the distribution instruction from the portable terminal.

9. An information providing apparatus according to claim 6, further comprising
   second input screen providing means for providing the portable terminal with input screen information for inputting third information for identifying an information terminal to which the second information is to be distributed according to the distribution instruction from the portable terminal.

10. An information providing apparatus according to claim 1, wherein the information terminal and the portable terminal are used by a single user, the information providing apparatus further comprises a user identification unit for identifying the user of the portable terminal, and the distribution unit distributes the information image to the information terminal or to the portable terminal that is used by the user identified by the user identification unit.

11. An information providing method for distributing an information image to an information terminal or to a portable terminal connected via a network, wherein the information image comprises image information and related information defining a unique process integrated as a single operation unit, the information providing method comprising the steps of:

receiving a request to distribute the information image;

distributing the information image to the information terminal;

identifying a user of the information terminal;

registering the user in association with the information image;

separating the information image into the image information and the related information; and re-distributing the separated image information and the related information together as a display page to the portable terminal, only when the user of the information terminal is also the user of the portable terminal, wherein the information terminal and the portable terminal are different terminals.

12. An information providing program, tangibly embodied in a storage medium, for re-distributing an information image to an information terminal or to a portable terminal connected via a network, wherein the information image comprises image information and at least related information defining a unique process integrated as a single operation unit, the information providing program causing a computer to execute the following operations when read by the computer:

receiving a request to distribute the information image;

distributing the information image to the information terminal;

identifying a user of the information terminal;

registering the user in association with the information image;

separating the information image into the image information and the related information; and re-distributing the separated image information and the related information together as a display page to the portable terminal, only when the user of the information terminal is the user of the portable terminal, wherein the information terminal and the portable terminal are different terminals.

* * * * *